United States Patent
Fan

(10) Patent No.: US 9,853,734 B1
(45) Date of Patent: Dec. 26, 2017

(54) APPARATUS AND METHODS FOR DIGITAL SIGNAL CONSTELLATION TRANSFORMATION

(71) Applicant: INPHI CORPORATION, Santa Clara, CA (US)

(72) Inventor: Shu Hao Fan, Sunnyvale, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/130,778

(22) Filed: Apr. 15, 2016

Related U.S. Application Data

(60) Provisional application No. 62/148,688, filed on Apr. 16, 2015.

(51) Int. Cl.
*H04B 10/00* (2013.01)
*H04B 10/40* (2013.01)
*H04B 10/61* (2013.01)

(52) U.S. Cl.
CPC ......... *H04B 10/40* (2013.01); *H04B 10/6165* (2013.01); *H04B 2210/252* (2013.01)

(58) Field of Classification Search
CPC .............. H04B 10/40; H04B 10/6165; H04B 2210/252
See application file for complete search history.

(56) References Cited

U.S. PATENT DOCUMENTS

| | | | | |
|---|---|---|---|---|
| 7,623,797 B2 * | 11/2009 | Crivelli | .............. | H04B 10/6971 375/233 |
| 8,041,233 B2 * | 10/2011 | Hueda | .................... | H04B 10/60 398/140 |
| 8,116,367 B2 * | 2/2012 | Carrer | ............... | H04L 25/03063 375/233 |
| 8,488,726 B2 * | 7/2013 | Hueda | ................. | H04L 25/0202 375/136 |
| 8,565,297 B2 | 10/2013 | Carrer et al. | | |
| 8,761,609 B1 * | 6/2014 | Agazzi | ................. | H04B 10/616 398/155 |
| 8,873,974 B2 | 10/2014 | Hueda et al. | | |

(Continued)

OTHER PUBLICATIONS

Chung et al., "Field Trial of Automatic Bias Control Scheme for Optical IQ Modulator and Demodulator with Directly Detected 112 Gb/s DQPSK Signal" Optics Express 24968, vol. 21, No. 21, Oct. 21, 2013, 7 pages.

(Continued)

*Primary Examiner* — Danny Leung
(74) *Attorney, Agent, or Firm* — Richard T. Ogawa; Ogawa P.C.

(57) ABSTRACT

Apparatus and method for digital signal constellation transformation are provided herein. In certain configurations, an integrated circuit includes an analog front-end that converts an analog signal vector representing an optical signal into a digital signal vector, and a digital signal processing circuit that processes the digital signal vector to recover data from the optical signal. The digital signal processing circuit generates signal data representing a signal constellation of the digital signal vector. The digital signal processing circuit includes an adaptive gain equalizer that compensates the signal data for distortion of the signal constellation arising from biasing errors of optical modulators used to transmit the optical signal.

33 Claims, 14 Drawing Sheets

(56) References Cited

U.S. PATENT DOCUMENTS

| | | | | |
|---|---|---|---|---|
| 8,886,055 | B1* | 11/2014 | Morero | H04L 1/0041 |
| | | | | 398/192 |
| 9,071,364 | B1* | 6/2015 | Voois | H04B 10/58 |
| 9,306,676 | B1* | 4/2016 | Castrillon | H04B 10/6165 |
| 9,337,934 | B1* | 5/2016 | Agazzi | H04B 10/40 |
| 9,391,715 | B1 | 7/2016 | Agazzi et al. | |
| 9,496,967 | B1 | 11/2016 | Castrillon et al. | |
| 2015/0089330 | A1* | 3/2015 | Xia | G06F 11/1008 |
| | | | | 714/773 |
| 2015/0171971 | A1* | 6/2015 | Enoki | H04B 10/50575 |
| | | | | 398/183 |

OTHER PUBLICATIONS

Kawakami et al., "Auto Bias Control Technique Based on Asymmetric Bias Dithering for Optical QPSK Modulation" Journal of Lightwave Technology, vol. 30, No. 7, Apr. 1, 2012, 7 pages.

\* cited by examiner

APPARATUS AND METHODS FOR DIGITAL SIGNAL CONSTELLATION TRANSFORMATION

CROSS-REFERENCE TO RELATED APPLICATIONS

This application claims the benefit of priority under 35 U.S.C. §119(e) of U.S. Provisional Patent Application No. 62/148,688, filed Apr. 16, 2015 and titled "DIGITAL CONSTELLATION TRANSFORMATION ALGORITHM FOR COMPENSATING DRIFTING AND DITHERING IMPAIRMENT OF MODULATOR BIAS CONTROLLER," which is herein incorporated by reference in its entirety for all purposes.

BACKGROUND

Field

This disclosure relates to methods and systems for high-speed optical communications.

Description of the Related Technology

There has been widespread adoption of personal electronic devices including smart phones, tablets, notebooks, laptops, digital camera, video recorders, gaming systems, etc. These devices are being used to communicate ever-increasing quantities of data, such as between different personal electronic devices, between personal electronic devices and peripheral devices (for example, display devices, external storage devices, etc.), and the like.

Enormous data communication demands are also present in a variety of other contexts. For example, data centers are communicating ever-increasing amounts of data, and also require fast and reliable data communication between devices. The various methods and systems disclosed herein provide various improvements and benefits vis-à-vis existing high-speed communication technologies.

SUMMARY

An innovative aspect of the subject matter disclosed herein is implemented in an integrated circuit comprising an analog front-end configured to convert an analog signal vector representing an optical signal into a digital signal vector; and a digital signal processing circuit configured to generate signal data representing a signal constellation of the digital signal vector. The digital signal vector comprises a digital representation of an in-phase (I) component and a quadrature-phase (Q) component of the optical signal. The digital signal processing circuit comprises an adaptive gain equalizer configured to generate transformed signal data by compensating the signal data for distortion of the signal constellation.

In various embodiments of the integrated circuit, the adaptive gain equalizer can be configured to generate an estimate of an angular tilt of the signal constellation and to compensate the signal data based on the estimate of the angular tilt. The adaptive gain equalizer can be configured to generate the estimate of the angular tilt based on a sum of a plurality of cross-correlations of I and Q components of the signal constellation. The sum of the plurality of cross-correlations can be computed over a moving window of data samples obtained from the digital signal vector. The adaptive gain equalizer can be configured to iteratively revise the estimate of the angular tilt until I and Q components of the transformed signal data are substantially uncorrelated. The adaptive gain equalizer can be configured to iteratively revise the estimate of the angular tilt based on a step gain that changes based on a number of times the angular tilt has been estimated. The adaptive gain equalizer can be configured to generate the transformed signal data based on a transformation matrix that includes the estimate of the angular tilt.

In various embodiments of the integrated circuit, the digital signal processing circuit can be configured to process the signal data for at least one of feed forward equalization or carrier recovery prior to compensating the signal data for distortion of the signal constellation. Various embodiments of the integrated circuit can further comprise a decision slicer configured to slice the transformed signal data. The distortion of the signal constellation can comprise at least one of squeezing, shifting, or tilting, in various embodiments, the optical signal can comprise a multi-level quadrature amplitude modulation (QAM) signal, a discrete multi-toned (DMT) modulation signal, an orthogonal frequency division multiplexing (OFDM), or a phase-shift keying (PSK) signal (including, but not limited to, a quadrature phase-shift keying (QPSK) signal).

Another innovative aspect of the subject matter disclosed herein is implemented in a method of digital signal constellation transformation in an optical communication device. The method comprises receiving an optical signal as an input to a coherent optical receiver; generating an analog signal vector representing the optical signal using the coherent optical receiver; converting the analog signal vector into a digital signal vector using an analog front-end; generating signal data representing a signal constellation of the digital signal vector using a digital signal processing circuit; and compensating the signal data for distortion of the signal constellation using an adaptive gain equalizer of the digital signal processing circuit. The digital signal vector comprises a digital representation of an in-phase (I) component and a quadrature-phase (Q) component of the optical signal.

In various embodiments of the method compensating the signal data for distortion can comprise generating an estimate of an angular tilt of the signal constellation and compensating the signal data based on the estimate of the angular tilt. The method can further comprise transforming the signal data based on a transformation matrix that includes the estimate of the angular tilt. In various embodiments of the method, generating the estimate of the angular tilt can comprise summing a plurality of cross-correlations of I and Q components of the signal constellation. The method can further comprise iteratively revising the estimate of the angular tilt. Various embodiments of the method can further comprise processing the signal data for at least one of feed forward equalization or carrier recovery prior to compensating the signal data for distortion of the signal constellation.

Yet another innovative aspect of the subject matter disclosed herein is implemented in an integrated optical module comprising a coherent optical receiver; and a transceiver. The coherent optical receiver is configured to receive an optical signal from an optical cable and generate an analog signal vector representing the optical signal. The transceiver is configured to process the analog signal vector to generate a digital signal vector comprising a digital representation of an in-phase (I) component and a quadrature-phase (Q) component of the optical signal. The transceiver is further configured to generate signal data representing a signal constellation of the digital signal vector. The transceiver comprises an adaptive gain equalizer configured to generate transformed signal data by compensating the signal data for distortion of the signal constellation.

In various embodiments of the integrated optical module, the adaptive gain equalizer can be configured to generate an estimate of an angular tilt of the signal constellation and to compensate the signal data based on the estimate of the angular tilt. The adaptive gain equalizer can be configured to generate the estimate of the angular tilt based on a sum of a plurality of cross-correlations of I and Q components of the signal constellation. The adaptive gain equalizer can be configured to iteratively revise the estimate of the angular tilt until I and Q components of the transformed signal data are substantially uncorrelated. The adaptive gain equalizer can provide separate distortion compensation for a first portion of the signal data associated with a horizontal polarization of the optical signal and for a second portion of the signal data associated with a vertical polarization of the optical signal.

An innovative aspect of the subject matter disclosed herein is implemented in an optical communication system comprising an optical transmitter configured to provide optical transmissions over an optical network; an optical receiver configured to receive an optical signal over the from the optical network and to generate an analog signal vector representing the optical signal; and a transceiver coupled to the optical transmitter and to the optical receiver. The transceiver comprises an analog front-end; and a digital signal processing circuit. The analog front-end is configured to convert the analog signal vector into a digital signal vector, wherein the digital signal vector comprises a digital representation of an in-phase (I) component and a quadrature-phase (Q) component of the optical signal configured to generate signal data representing a signal constellation of the digital signal vector. The digital signal processing circuit comprises an adaptive gain equalizer configured to generate transformed signal data by compensating the signal data for distortion of the signal constellation.

In various embodiments of the optical communication system, the adaptive gain equalizer can be configured to generate an estimate of an angular tilt of the signal constellation and to compensate the signal data based on the estimate of the angular tilt. The optical transmitter can comprise one or more modulators and an automatic bias controller configured to bias the one or more modulators.

BRIEF DESCRIPTION OF THE DRAWINGS

Example implementations disclosed herein are illustrated in the accompanying schematic drawings, which are for illustrative purposes only.

DETAILED DESCRIPTION OF EMBODIMENTS

Figure 1:
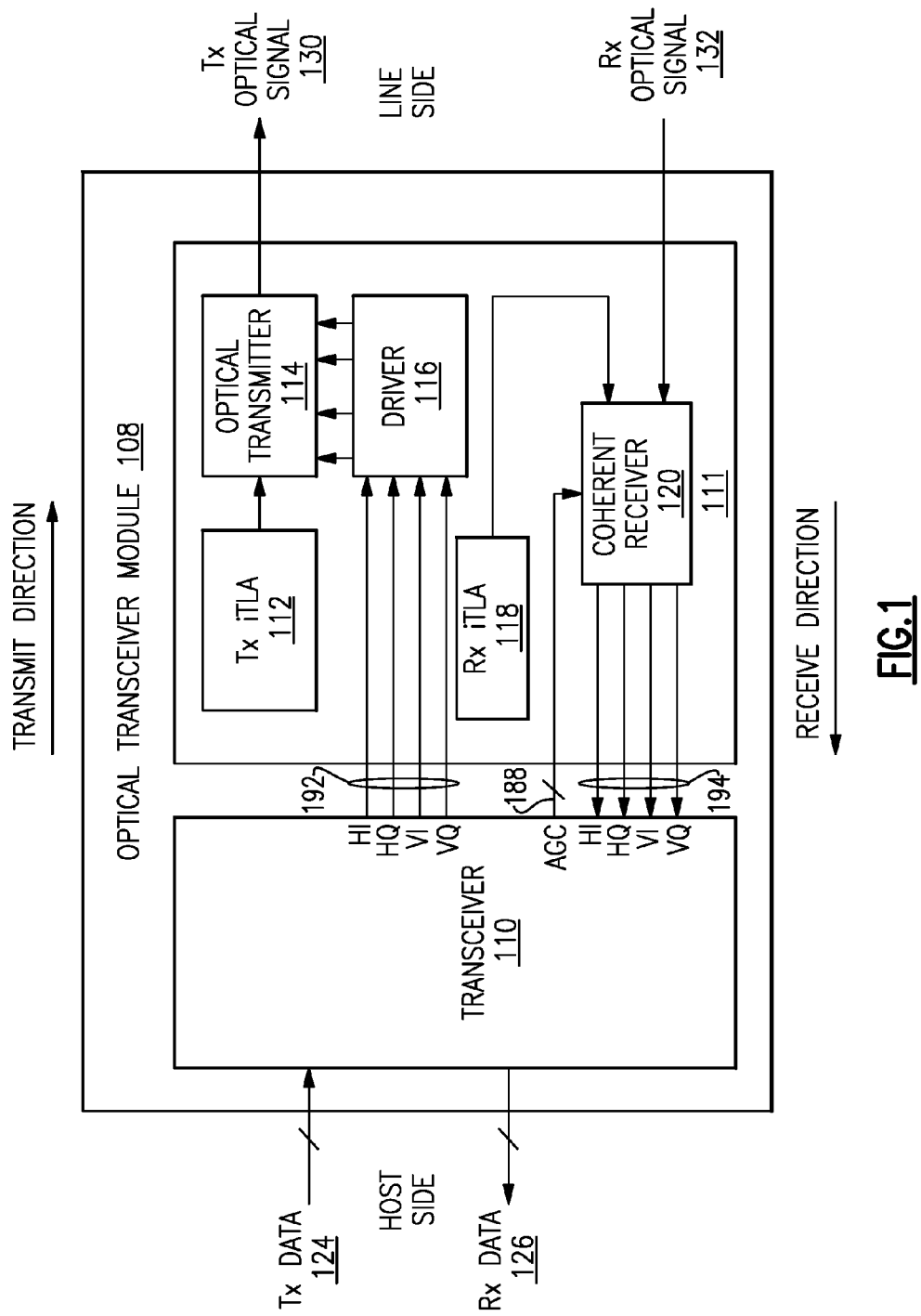
FIG. 1 is a schematic diagram of one embodiment of an optical transceiver module.

The following detailed description is directed to certain implementations for the purposes of describing the innovative aspects. However, the teachings herein can be applied in a multitude of different ways. As will be apparent from the following description, the innovative aspects may be implemented in any high-speed communication system that is configured to transmit and receive data between electronic devices which can include laptops, notebooks, tablets, desktop computers, data centers, gaming devices, data storage systems, input/output peripheral devices, display devices, etc. The innovative aspects may be implemented in or associated with data transport networks, storage area networks, enterprise networks, private networks, secure networks, financial networks, etc. Other uses are also possible.

A high-speed communication link can include an optical cable, such as a fiber-optic cable. Additionally, an optical transmitter positioned on one end of the optical cable can transmit data to an optical receiver positioned on the other end of the optical cable.

An optical transmitter can include optical modulators for transmitting optical signals over the optical cable. In certain implementations, the optical transmitter can employ automatic bias control to bias the optical modulators to enhance the accuracy of transmissions. In one example, an optical transmitter includes a first optical modulator for generating in-phase (I) optical signal, a second optical modulator for generating a quadrature-phase (Q) optical signal, and an automatic bias controller used to control biasing of the optical modulators. For instance, the automatic bias controller can generate a first bias voltage that controls an offset of the first optical modulator, a second bias voltage that controls an offset of the second optical modulator, and a third bias voltage that controls a phase difference between the I and Q optical signals.

Although automatic bias control can enhance the performance of communications over an optical cable, an automatic bias controller may not precisely control the bias voltages to the desired values. For example, the bias voltages can include small perturbations associated with dithering and/or the voltage levels of the bias voltages can drift due to a searching algorithm and/or a change in operating environment.

Errors in the optical transmitter's modulator bias voltages can lead to decoding errors at the optical receiver, such as burst errors and/or loss of frames. Sensitivity to errors in modulator biasing can be exacerbated in applications using high-order modulation formats, such as 16-QAM or discrete multitoned (DMT) modulation.

Apparatus and method for digital signal constellation transformation are provided herein. In certain configurations, an integrated circuit includes an analog front-end that converts an analog signal vector representing an optical signal into a digital signal vector, and a digital signal processing circuit that processes the digital signal vector to recover data from the optical signal. The digital signal processing circuit generates signal data representing a signal constellation of the digital signal vector. The digital signal processing circuit includes an adaptive gain equalizer that compensates the signal data for distortion of the signal constellation arising from biasing errors of optical modulators used to transmit the optical signal.

The teachings herein can be used to increase the tolerance of an optical receiver to modulator biasing errors, including bias errors that generate a phase error between I and Q components of the optical signal. For example, the optical receivers herein can exhibit enhanced robustness to biasing errors arising from dithering and/or a searching algorithm of an optical transmitter's automatic bias controller.

In certain implementations, the adaptive gain equalizer compensates the signal data for distortion based on detecting an amount of angular tilt of the signal constellation arising from modulator biasing errors. In one example, a QAM signal constellation ideally has about a 90° a separation between I and Q signal components, but modulator biasing errors can lead to the QAM signal constellation being at a tilted angle with respect to 90°. To compensate for the angular tilt, the adaptive gain equalizer can transform the signal data representing the signal constellation using a transformation matrix that includes an estimated value of the tilted angle.

In certain configurations, the estimated value of the titled angle is determined via iteration by adjusting a previous estimate of the titled angle based on a cross-correlation of I and Q components of the transformed signal data. In certain implementations, the estimated value of the titled angle is generated by iteratively adjusting the titled angle until the cross-correlation is within a convergence threshold. The cross-correlation can be implemented in a variety of ways, and can be performed over m data points of the signal constellation. In certain implementations, the m data points are associated with a sum of cross-correlations of a moving window of data samples. Thus, the estimated value of the titled angle can dynamically track changes to the modulator biasing errors. The iterative process can be controlled using a step gain K that can be adjusted to control a trade-off between convergence speed and stability. In certain implementations, the step gain K can be dynamically controlled, such as by changing the step gain K based on a number of times the titled angle has been iteratively estimated.

The integrated circuit can further include a decision slicer that slices the transformed signal data generated by the adaptive gain equalizer to determine where particular data points of the signal constellation belong. By compensating for distortion of the signal constellation before slicing, the bit error rate of an optical receiver can be reduced.

The teachings herein can be used to compensate for distortion of a signal constellation of a wide variety of formats, including, but not limited to, quadrature amplitude modulation (QAM), discrete multitoned (DMT) modulation, orthogonal frequency division multiplexing (OFDM), and phase-shift keying (PSK) (including, but not limited to, quadrature phase-shift keying (QPSK)) for both coherent and direct-detected systems. Although example signal formats have been provided, a digital signal constellation transformation can be applied to other signals, such as signals having a signal constellation that is substantially symmetric with respect to an origin.

Examples of Optical Communication Devices

FIG. 1 is a schematic diagram of one embodiment of an optical transceiver module or integrated optical module 108. The optical transceiver module 108 includes a transceiver 110 and an optics block 111. In the illustrated embodiment, the optics block 111 includes a transmit integrated tunable laser assembly (Tx iTLA) 112, a receive integrated tunable laser assembly (Rx iTLA) 118, an optical transmitter 114, a driver 116, and a coherent receiver 120.

The optical transceiver module 108 receives transmit (Tx) data 124 from a host device on a host side, and processes the transmit data 124 to generate a transmit optical signal 130 for transmission over an optical cable on a line side. Additionally, the optical transceiver module 108 receives a receive (Rx) optical signal 132 from the optical cable, and processes the receive optical signal 132 to generate receive data 126 provided to the host device.

Although FIG. 1 illustrates one embodiment of an optical transceiver module, an optical transceiver module can be implemented in a wide variety of ways. For example, the optical transceiver module 108 of FIG. 1 can include more or fewer components and/or a different arrangement of components.

The optics block 111 can be implemented in a wide variety of ways. In one example, the optics block 111 is implemented to communicate over an optical cable based on Indium Phosphide (InP) modulator technology. In another example, the optics block 111 is implemented to communicate over an optical cable based on Lithium Niobate (LiNb) modulator technology. Although two examples of modulator technology have been provided, the teachings herein are applicable to a wide variety of modulator technologies.

In certain implementations, the transceiver 110 operates using a programmable host interface and/or programmable optical interface protocol, thereby enhancing flexibility by providing compatibility with a wide variety of host devices and/or optical networks. In one example, the transceiver 110 includes a host interface that can communicate using various standards such as, for example, 100 GE, OTU4, OTU3, and/or other interfacing standards. In another example, the transceiver 110 operates in conjunction with the optics block 111 to transmit and receive optical signals associated with a wide variety of optical communication protocols, including for example, QAM, DMT, and/or PSK (including, but not limited to, APSK and/or QPSK). The transceiver 110 can be implemented with internal mapping and framing capability to provide translation between the host interface protocol and the optical interface protocol. In certain implementations, the transceiver 110 has at least one of a programmable data rate or programmable error correction scheme.

The optical transceiver module 108 can communicate with a wide variety of host devices, including, but not limited to, a mobile computing device, a personal computing device, a workstation, a peripheral device, a hub, and/or a network router. In certain implementations, the transmit (Tx) data 124 and/or the receive (Rx) data 126 are digital electrical signals, such as multi-bit digital signals.

In the transmit direction of the optical transceiver module 108, the transceiver 110 processes the transmit data 124 received from the host side to generate an analog transmit signal vector 192. In one example, the analog transmit signal vector 192 includes four signals representing in-phase (I) and quadrature (Q) components for each of horizontal (H)

and vertical (V) polarizations (represented as HI, HQ, VI, and VQ in FIG. 1). However, other implementations are possible.

In the receive direction of the optical transceiver module 108, the transceiver 110 receives an analog receive signal vector 194 from the coherent receiver 120 and performs signal processing functions that can include, for example, equalization and/or timing recovery to generate the receive data 126. In one example, the analog receive signal vector 194 includes four signals representing I and Q components for each of horizontal and vertical polarizations (represented as HI, HQ, VI, VQ in FIG. 1). However, other implementations are possible.

In the optics block 111, the Tx iTLA 112 generates an optical carrier signal and provides the optical carrier signal to the optical transmitter 114. The driver 116 operates in combination with the optical transmitter 114 to modulate the HI/HQ and VI/VQ signals onto optical carriers in horizontal and vertical polarizations, respectively, for transmission over an optical cable on the line side. In the receive direction, the Rx iTLA 118 generates a local oscillator (LO) signal at approximately the carrier frequency of the received optical signal 132. The coherent receiver 120 receives the LO signal from the Rx iTLA 118 and demodulates the incoming optical signal 132 to baseband to generate the analog receive signal vector 194.

In one embodiment, the transceiver 110 generates an automatic gain control (AGC) signal 188, which provides feedback to the coherent receiver 120 based on the strength of the analog receive signal vector 194. The AGC signal 188 may comprise a single signal or multiple signals. In one example, the AGC signal 188 includes four gain control signals for controlling gain of HI, HQ, VI, and VQ signals of the analog receive signal vector 194.

In certain implementations, the optical transceiver module 108 is implemented as a pluggable module that can be integrated in an optical communication system. Various features of the optical transceiver module 108 of FIG. 1 can be similar to those described in commonly-owned U.S. Pat. No. 9,071,364, issued Jun. 30, 2015, and titled "COHERENT OPTICAL TRANSCEIVER WITH PROGRAMMABLE APPLICATION MODES," which is herein incorporated by reference in its entirety for all purposes.

Although FIG. 1 illustrates one example of an optical communication device that can be implemented to provide a constellation transformation algorithm, the teachings herein are applicable to wide variety of optical communication devices. Moreover, although FIG. 1 illustrates a configuration including both a transmit path and a receive path, the teachings herein are also applicable to optical communication devices that omit a transmit path.

Figure 2:
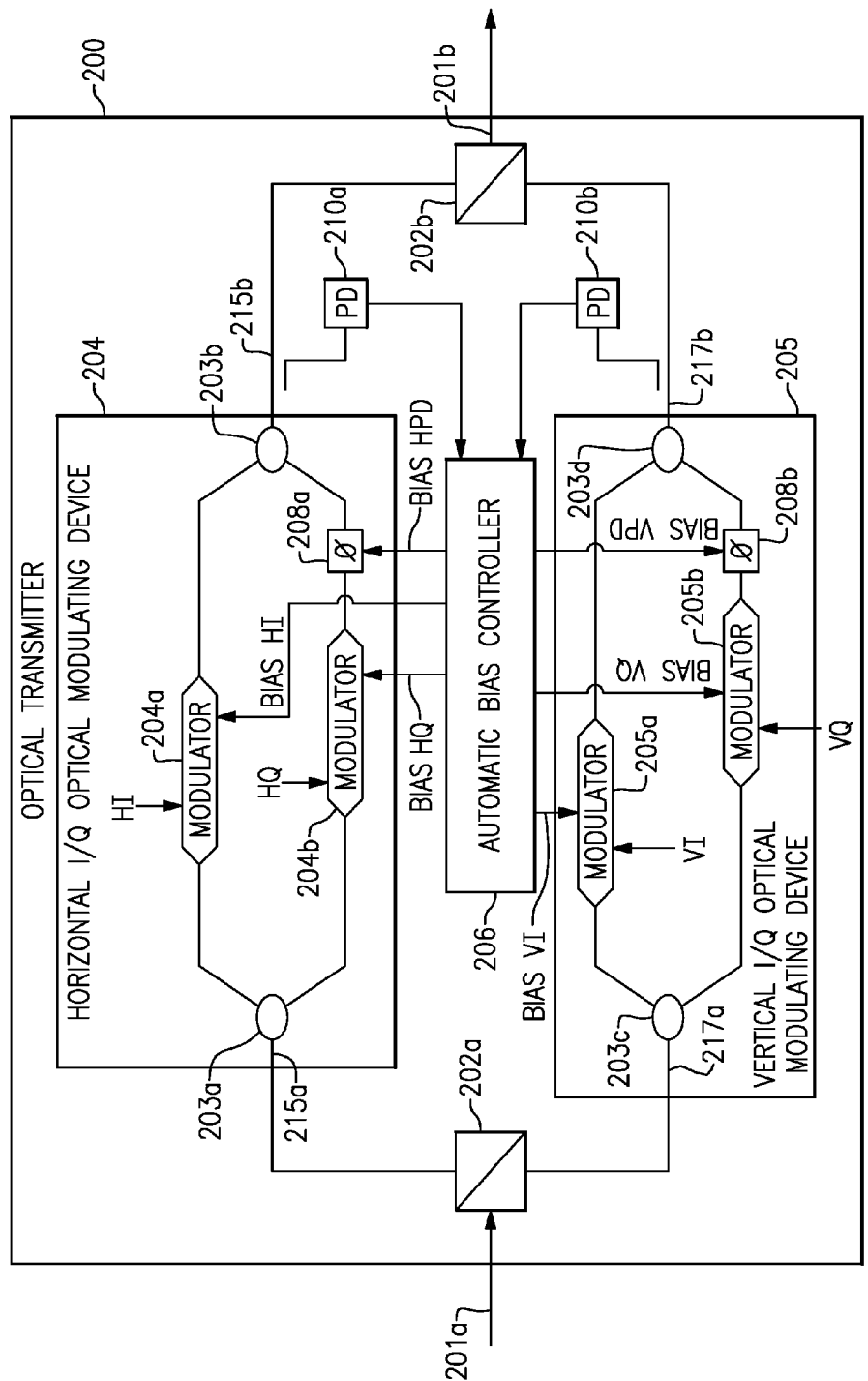
FIG. 2 is a schematic diagram of an optical transmitter that can be employed to generate spectrally efficient optical signals.

FIG. 2 is a schematic diagram of an optical transmitter 200 that can be employed to generate spectrally efficient optical signals. The optical transmitter 200 includes an optical splitter 202a, an optical coupler 202b, a horizontal I/Q optical modulating device 204, a vertical I/Q optical modulating device 205, an automatic bias controller 206, horizontal photodetector 210a, and a vertical photodetector 210b.

Although FIG. 2 illustrates one embodiment of an optical transmitter, an optical transmitter can be implemented in a wide variety of ways. For example, the optical transmitter 200 of FIG. 2 can include more or fewer components and/or a different arrangement of components.

The horizontal and vertical I/Q optical modulating devices 204 and 205 can be used to convert electrical I/Q signals into optical signals with orthogonal optical polarizations (for example, horizontal (H) and vertical (V) polarizations). In the illustrated embodiment, the horizontal and vertical I/Q optical modulating devices 204 and 205 each include a phase shifter and a pair of Mach-Zehnder modulators to convert electrical signals into I and Q optical signals or light waves. For example, the horizontal I/Q optical modulating device 204 includes a first optical modulator 204a, a second optical modulator 204b, and a phase shifter 208a. Additionally, the vertical I/Q optical modulating device 205 includes a first optical modulator 205a, a second optical modulator 205b, and a phase shifter 208b.

The optical transmitter 200 receives an input light beam along an input path 201a, and generates a modulated optical signal along an output path 201b. In one example, the input light beam corresponds to a light output from the Tx iTLA 112 of FIG. 1, and the modulated optical signal corresponds to the Tx optical signal 130 of FIG. 1. The input path 201a and the output path 201b can be implemented in a variety of ways, such as by using an optical waveguide and/or an optical fiber.

The optical splitter 202a splits the input light beam into a first component that is provided as an input to the horizontal I/Q optical modulating device 204 and a second component that is provided as an input to the vertical I/Q optical modulating device 205. In the illustrated embodiment, the optical splitter 202a includes a polarization beam splitter (PBS) that can split the input light beam into a first component having horizontal (H) polarization (for example, TM polarization) and a second component having a vertical (V) polarization (for example, TE polarization). Although illustrated as a polarization beam splitter, the optical splitter 202a can be implemented in a wide variety of ways, such as by using waveguide and/or fiber-based optical components that split the optical power of the input light beam equally or unequally.

The first and the second components of the input light beam are coupled into input optical waveguides 215a and 217a of the horizontal and vertical I/Q optical modulating devices 204 and 205, respectively. An optical splitter 203a further divides the first component of the input light between the optical modulators 204a and 204b of the horizontal I/Q optical modulating device 204, and an optical splitter 203c divides the second component of the input light between the optical modulators 205a and 205b of the vertical I/Q optical modulating device 205.

Light inputted into optical modulators 204a, 204b, 205a, and 205b is modulated with the electrical signals HI, HQ, VI and VQ, respectively. The light output of the optical modulators 204b, 205b is shifted using the phase shifters 208a, 208b, respectively. Additionally, the light outputs of the optical modulator 204a and the phase shifter 208a are combined using the optical coupler 203b and provided to an output waveguide 215b. Furthermore, the light outputs of the optical modulator 205a and the phase shifter 208b are combined using the optical coupler 203d and provided to an output waveguide 217b.

The optical splitters 203a and 203c and the optical couplers 203b and 203d can be implemented in a wide variety of ways, and can include directional couplers, multimode interference couplers and/or other optical components. As shown in FIG. 2, modulated light propagating along the output optical waveguides 215b and 217b is combined by an optical coupler 202b to generate the modulated optical signal on the output path 201b. In the illustrated embodiment, the optical coupler 202b includes a polarization beam combiner. However, the optical coupler 202b can be implemented in other ways, such as using optical waveguide and/or fiber-based components suitable for combining light beams.

The optical modulators 204a, 204b, 205a and 205b can be implemented in a wide variety of ways. In one example, the optical modulators 204a, 204b, 205a and 205b are Mach-Zehnder modulators implemented on a substrate including an electro-optic material such as, for example, lithium niobate ($LiNbO_3$) or indium phosphide (InP). For example, each of the Mach-Zehnder modulators can include an input waveguide that is split into a first branch and a second branch that extend along a length of the substrate and that are coupled together to form an output waveguide.

The illustrated optical transmitter 200 includes the automatic bias controller 206, which generates bias voltages for biasing the horizontal and vertical I/Q optical modulating devices 204 and 205. For example, with respect to the horizontal I/Q optical modulating device 204, the automatic bias controller 206 generates a first bias voltage (BIAS HI) for biasing the first optical modulator 204a, a second bias voltage (BIAS HQ) for biasing the second optical modulator 204b, and a third bias voltage (BIAS HPD) for biasing the phase shifter 208a. Additionally, with respect to the vertical I/Q optical modulating device 205, the automatic bias controller 206 generates a first bias voltage (BIAS VI) for biasing the first optical modulator 205a, a second bias voltage (BIAS VQ) for biasing the second optical modulator 205b, and a third bias voltage (BIAS VPD) for biasing the phase shifter 208b.

Although illustrated as part of the optical transmitter 200, in certain implementations the automatic bias controller 206 is separate from the optical transmitter 200. The automatic bias controller 206 can be implemented in a wide variety of ways, and can include one or more data converters, amplifiers, detectors, filters, microprocessors, microcontrollers, digital signal processors (DSPs), field programmable gate arrays (FPGAs), memories, and/or other electronic circuitry.

The automatic bias controller 206 controls the bias voltages of the horizontal I/Q optical modulating device 204 based on feedback received via the horizontal photodetector 210a. In one example, the automatic bias controller 206 controls a voltage level of the first bias voltage (BIAS HI) to control an offset of a horizontal I component of the modulated optical signal, controls a voltage level of the second bias voltage (BIAS HQ) to control an offset of a horizontal Q component of the modulated optical signal, and controls a voltage level of the third bias voltage (BIAS HPD) to control a phase difference between the horizontal I component and the horizontal Q component of the modulated optical signal to about 90 degrees. Similarly, the automatic bias controller 206 controls the bias voltages of the vertical I/Q optical modulating device 205 based on feedback received via the vertical photodetector 210b.

The bias voltages or points of the horizontal and vertical I/Q optical modulating devices 204 and 205 can change due to a wide variety of reasons, such as temperature changes, aging, and/or by dithering and/or a searching algorithm of the automatic bias controller 206. In the illustrated embodiment, the automatic bias controller 206 receives feedback via the horizontal and vertical photodetectors 210a, 210b. However, other implementations of feedback can be used.

In one embodiment, the automatic bias controller 206 applies a low frequency dither signal to one or more of the bias points of the horizontal I/Q optical modulating device 204 and/or the vertical I/Q optical modulating device 205. Additionally, the impact of the dithering can be observed via the horizontal and/or vertical photodetectors 210a and 210b.

Thus, the automatic bias controller 206 can analyze and track the drilling of the biases by observing the impact of dithering. However, the automatic bias controller 206 can employ other tracking algorithms.

Although FIG. 2 illustrates one example of an optical transmitter that can be used to transmit a modulated optical signal, a constellation transformation algorithm can be applied to optical signals received from a wide variety of optical transmitters. For example, although FIG. 2 illustrates a configuration in which the modulated optical signal is a dual-polarization signal including both horizontal and vertical components, a constellation transformation algorithm can be applied to a received optical signal that includes a single polarization. Moreover, an optical receiver can provide a constellation transformation to an optical signal that is received from an optical transmitter that does not employ automatic bias control.

Examples of Compensating for Drift in Modulator Bias Voltages

The growth in global data traffic can lead to congestions in telecommunication networks. Such networks can benefit from using spectrally efficient modulation schemes including, for example, quadrature amplitude modulation (QAM) or discrete multitoned (DMT) modulation, which can accommodate more data channels within an available bandwidth with little to no increase in interference between channels.

However, the complexity of higher-order modulation formats can result in tighter margin and less tolerance to the impairment of optical transmission channels. For example, when operating near an error-correction threshold, a small perturbation or drifting of modulator bias voltages can cause a series of burst errors or even trigger loss of frames in the optical receiver. Sensitivity to bias voltage drift can be exacerbated in implementations using complex modulation formats, such as 16-QAM or DMT modulated signals.

An automatic bias controller, such as the automatic bias controller 206 of FIG. 2, may efficiently compensate for drift of bias voltages used to control I and Q offset (for example, BIAS HI, BIAS HQ, BIAS VI, and BIAS VQ of FIG. 2). However, the automatic bias controller may not fully compensate for the drift of the horizontal and/or vertical phase bias voltages (for example, BIAS HPD and BIAS VPD of FIG. 2).

One reason for this can be that the strength of feedback associated with drift of the horizontal and/or vertical phase bias voltage (for example, BIAS HPD and BIAS VPD of FIG. 2) can be significantly smaller, such as an order of magnitude smaller, than the strength of feedback associated with bias voltages used to control I and Q offset (for example, BIAS HI, BIAS HQ, BIAS VI, and BIAS VQ of FIG. 2). Accordingly, an automatic bias controller may not accurately track drift of horizontal and/or vertical phase bias voltages, which can lead to bit-error rate (BER) fluctuations and/or burst errors for signals with complex modulation formats.

In an optical communication system, data from the received optical signal can be recovered using a coherent receiver (for example, the coherent receiver 120 of FIG. 1), which in turn can be processed by a transceiver (for example the transceiver 110 FIG. 1). The transceiver can perform one or more signal processing functions including, but not limited to, chromatic dispersion correction, timing recovery, carrier recovery, and/or feed-forward equalization (FFE) to compensate for signal distortions arising from loss and/or noise in the optical channel.

In one example, a transceiver recovers data from an optical signal in a 16-level quadrature amplitude modulated (QAM) format. In such an example, the recovered symbols of the 16-level QAM signal can be mapped onto a constellation diagram or map that includes 16 symbols in a two-dimensional X-Y plane scatter diagram. Additionally, each symbol represents 4-bits of digital data. Without any loss of generality, for a 16-QAM modulated optical signal, the X-axis of the constellation map can correspond to the I component and the Y-axis can correspond to the Q component of the recovered electrical signal, or vice versa.

However, errors in the optical transmitter's modulator bias voltages can lead to distortions in the constellation diagram, which can lead to errors in recovering symbols. For example, the bias voltages can include small perturbations associated with dithering and/or the voltage levels of the bias voltages can drift due to a searching algorithm and/or a change in operating environment.

Apparatus and method for digital signal constellation transformation are provided herein. In certain configurations, an integrated circuit includes an analog front-end that converts an analog signal vector representing an optical signal into a digital signal vector, and a digital signal processing circuit that processes the digital signal vector to recover data from the optical signal. The digital signal processing circuit generates signal data representing a signal constellation of the digital signal vector. The digital signal processing circuit includes an adaptive gain equalizer that compensates the signal data for distortion of the signal constellation arising from biasing errors of optical modulators used to transmit the optical signal.

In certain implementations, the adaptive gain equalizer compensates the signal data for distortion based on detecting an amount of angular tilt of the signal constellation arising from modulator biasing errors. In one example, a QAM signal constellation ideally has about a 90° a separation between I and Q signal components, but modulator biasing errors can lead to the QAM signal constellation being at a tilted angle with respect to 90°. To compensate for an angular tilt, the adaptive gain equalizer can transform the signal data representing the signal constellation using a transformation matrix that includes an estimated value of the tilted angle.

In certain configurations, the estimated value of the titled angle is determined via iteration by adjusting a previous estimate of the titled angle based on a cross-correlation of I and Q components of the transformed signal data. In certain implementations, the estimated value of the titled angle is generated by iteratively adjusting the titled angle until the cross-correlation is within a convergence threshold. The cross-correlation can be implemented in a variety of ways, and can be performed over m data points of the signal constellation. In certain implementations, the m data points are associated with a sum of the cross-correlation of a moving window of data samples. Thus, the estimated value of the titled angle can dynamically track changes to the modulator biasing errors. The iterative process can be controlled using a step gain K that can be adjusted to control a trade-off between convergence speed and stability. In certain implementations, the step gain K can be dynamically controlled, such as by changing the step gain K based on a number of times the titled angle has been iteratively estimated.

The integrated circuit can further include a decision slicer that slices the transformed signal data generated by the adaptive gain equalizer to determine where particular data points of the signal constellation belong. By compensating for distortion of the signal constellation before slicing, the bit error rate of an optical receiver can be reduced.

Figure 3A:
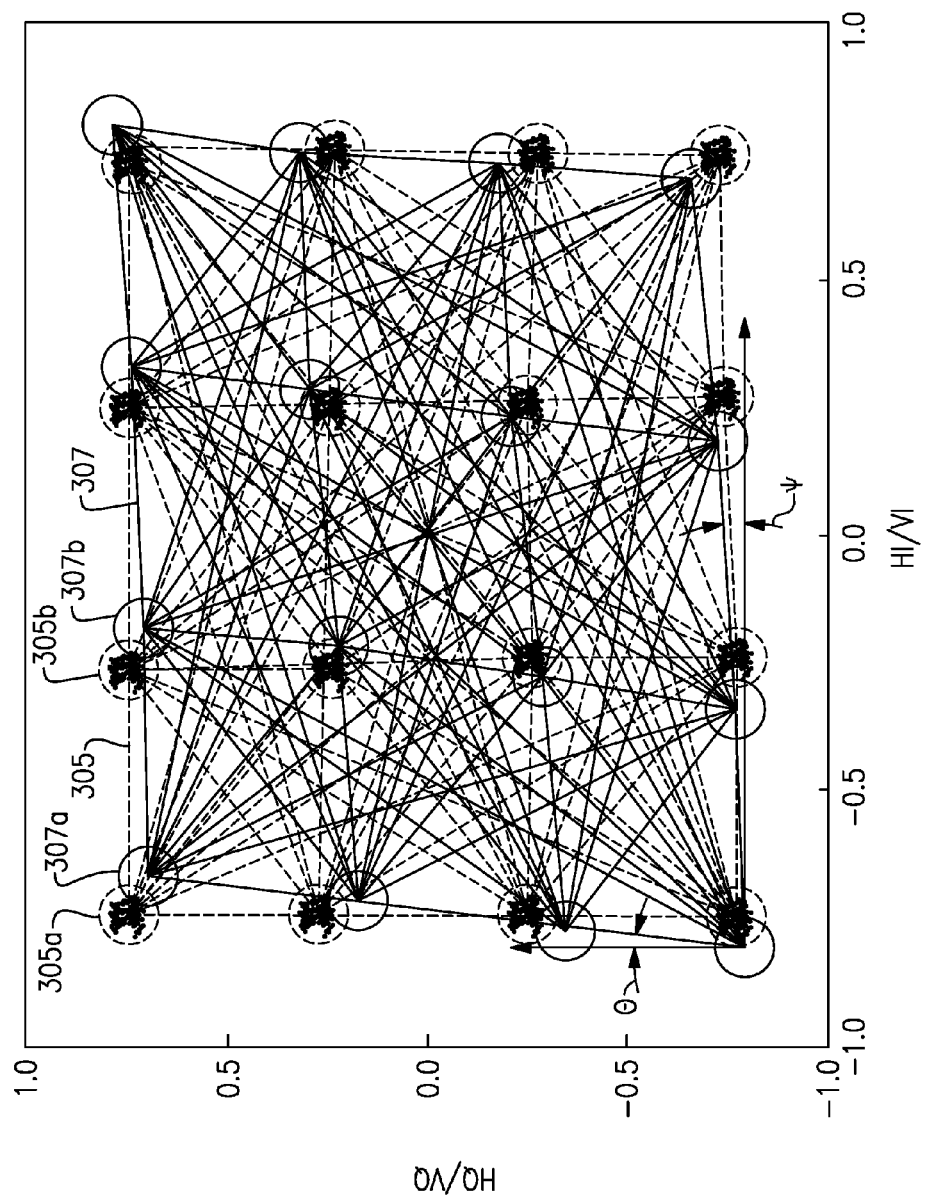
FIG. 3A is a graph of two examples of constellation maps formed by the symbols of a 16-level QAM

FIG. 3A is a graph of two examples of constellation maps formed by the symbols of a 16-level QAM signal. The post-transformation constellation map 305 formed by dashed circles (fir example, 305a, 305b) represents the location of the 16 symbols after application of one example of a constellation transformation algorithm in accordance with the teachings herein. Additionally, the pre-transformation constellation map 307 formed by solid circles (for example, 307a, 307b) represents the location of the 16 symbols prior to application of the constellation transformation algorithm.

As shown in FIG. 3A, the pre-transformation constellation map 307 includes distortion associated with drift in horizontal and vertical phase bias voltages of horizontal and vertical I/Q optical modulating devices. Additionally, the post-transformation constellation map 305 has been compensated to reduce the impact of distortion arising from drift in the horizontal and vertical phase bias voltages.

As shown in FIG. 3A, the 16 symbols of the post-transformation constellation map 305 are arranged along four rows and four columns that form a substantially rectangular grid parallel to the X- and Y-axes. However, the pre-transformation constellation map 307 illustrates that drift in the horizontal and/or vertical phase bias voltages can result in a constellation map being shifted, squeezed and/or rotated with respect to the X- and Y-axes.

For example, the pre-transformation constellation map 307 in FIG. 3A is oriented at an angle θ with respect to an axis parallel to the Y-axis and at an angle ψ with respect to an axis parallel to the X-axis. In various embodiments, the angle θ can be equal to the angle ψ. In some embodiments, the angle θ can be greater than or less than the angle ψ. Various algorithms can be used to compensate for any differences in the magnitude of angle θ and angle ψ. For example, carrier recovery algorithms employed by carrier recovery blocks in receiver systems (e.g., transceiver 110, transceiver chip 400, receiver path architecture 450, optical receiver 608a and 608b) can align the constellation to the diagonal axis centered at the origin such that the angle θ is approximately equal to the angle ψ. Examples of carrier recovery algorithms employed to compensate for any differences in the magnitude of angle θ and angle ψ can include coarse/fine carrier recovery, Viterbi-Viterbi estimation, etc.

In certain implementations, data recovered from an optical receive signal is provided to a slicer to determine the received symbol. For instance, with respect to the example shown in FIG. 3A, a slicer can be used to determine which of the 16 symbols on the constellation diagram is closest to a received symbol, which may be degraded by noise, losses, and/or channel non-linearity. In additive white Gaussian noise (AWGN) channels, the slicer can determine the points by slicing about in the middle. For example, for the constellation maps 305 and 307 illustrated in FIG. 3A, the decision boundary can be at [+0.5, 0, −0.0.5] for each axis. For instance, if a received symbol has an X-axis value less than −0.5 and a Y-axis value greater than +0.5, then the slicer may map the received symbol to symbol 305a.

As discussed above, errors in modulator biasing can distort a constellation. For example, drift of modulator phase bias voltages can result in the constellation being shifted, squeezed and/or rotated. For example, a constellation can be rotated or squeezed into a diamond shape, as depicted by the pre-transformation constellation map 307 of FIG. 3A. As described herein, an integrated circuit can include an adaptive gain equalizer that compensates data representing a constellation map for errors in modulator bias voltages.

The distortion of the constellation map due to drift in horizontal and/or vertical bias voltages can result in a correlation between I and Q components of a constellation map. The distortion can lead to a decrease in extinction ratio or otherwise degrade performance.

The pre-transformation constellation map 307 in FIG. 3A includes distortion resulting from a drift of a horizontal phase bias voltage of a horizontal I/Q optical modulating device 204 by an amount greater than 5 degrees, in this example. As discussed above, due to signal processing functions such as, for example, feed-forward equalization (FFE) and fine carrier recovery (FCR) performed by a digital signal processing circuit of a transceiver, the pre-transformation constellation map 307 is aligned at about a 45 degree diagonal line and centered at about the origin point such that the angle θ is approximately equal to the angle ψ. For example, in various embodiments, the difference between angle θ and the angle ψ can be less than 10%. The constellation distortion can be viewed as a two-dimensional (2D) axis transformation.

The teachings herein can be used to compensate for drift in horizontal and/or vertical phase bias voltages of optical modulating devices. In certain configurations, a digital signal processing circuit processes received data using a constellation transformation algorithm (CTA).

In one embodiment, the constellation transformation algorithm compensates for an angular tilt of a constellation map, such as the pre-transformation constellation map 307 of FIG. 3A, by applying a transformation matrix given by equation (1) below. By compensating the constellation map for distortion before slicing, the hit error rate of an optical receiver can be reduced.

$$\frac{1}{\cos^2\theta - \sin^2\theta}\begin{bmatrix} \cos\theta & -\sin\theta \\ -\sin\theta & \cos\theta \end{bmatrix} \quad (1)$$

In equation (1) above, θ represents the tilt of the constellation map from an ideal position, such as an orthogonal position. In one embodiment, θ is obtained iteratively using equation (2) below, where wi and wq are I and Q components, respectively, of a recovered optical signal after feed-forward equalization (FFE) and carrier recovery.

$$\theta_n = \theta_{n-1} + R(wi, wq) \times K \quad (2)$$

In equation (2) above equation, K is the step gain factor, which can be adjusted to increase convergence speed and/or stability. The step gain factor K can be selected based on the noise in the channel. Additionally, R(wi, wq) is the cross-correlation function of wi, wq. In one embodiment, R(wi, wq) is given by equation (3) below, where in is the number of data points used in the cross-correlation function.

$$R(w_i, w_q) = \Sigma_m w_i[m] \times w_q[m] \quad (3)$$

In one embodiment, at each $n^{th}$ iteration, the integrated circuit implementing the algorithm: (1) generates a new transformation matrix based on the value of $\theta_n$ obtained in the $n^{th}$ iteration in equation (1) above; (2) applies the new transformation matrix $M_n$ to the constellation map $C_{n-1}$ obtained in the $(n-1)^{th}$ iteration to obtain a new constellation map $C_n$; (3) derives modified I and Q components $wi_n$ and $wq_n$ from the new constellation map $C_n$; and (4) determines the cross-correlation between the derived modified I and Q components $wi_n$ and $wq_n$.

In certain implementations, the algorithm is converged to the point where $R(wi_n, wq_n)$ is close to zero(0), such as when $R(wi_n, wq_n)$ is less than a convergence threshold. For example, convergence can be considered to be achieved if $R(wi_n, wq_n)$ is less than or equal to a threshold value (for example, less than or equal to 0.5, less than or equal to 0.1, less than or equal to 0.01, less than or equal to 0.001, less than or equal to 0.0001 or values in between these ranges and sub-ranges). Converging the algorithm in this manner can be used to determine when the I and Q signals are substantially uncorrelated. In one embodiment, the algorithm is converged until the I and Q signals are substantially orthogonal. In certain implementations, the step gain factor K can be adaptively controlled. For example, the step gain factor K can be adaptively changed over time such that it is relatively large in the beginning of the iterative process and is relatively small as $R(wi_n, wq_n)$ approaches zero(0).

In one embodiment, the integrated circuit implementing the algorithm provides a constellation transformation separately to I/Q data associated with horizontal and vertical polarizations. Implementing the integrated circuit in this manner enhances the accuracy of constellation transformation by allowing different amounts of tilt adjustment to be provided for a horizontal constellation map and for a vertical constellation map. In such an embodiment, $\theta_H$ for adjusting a horizontal constellation map is obtained by iteratively processing I and Q data associated with a horizontal polarization, and $\theta_V$ for adjusting a vertical constellation map is obtained by iteratively processing I and Q data associated with a vertical polarization. In one embodiment, the digital signal vector includes data representing a single polarization modulation or a dual-polarization modulation, and the integrated circuit is configurable between a first mode in which a tilt adjustment is provided to the data representing the single polarization modulation, and a second mode in which a separate tilt adjustment for each polarization is provided to the data representing the dual-polarization modulation. Thus, in one embodiment, an IC can be configurable to selectively process a signal of single polarization modulation or a signal of dual-polarization modulation. In another embodiment, an IC is operable to process signals of single polarization modulation but not of dual polarization modulation. In yet another embodiment, an IC is operable to process signals of dual-polarization modulation but not of single polarization modulation.

Figure 3C:
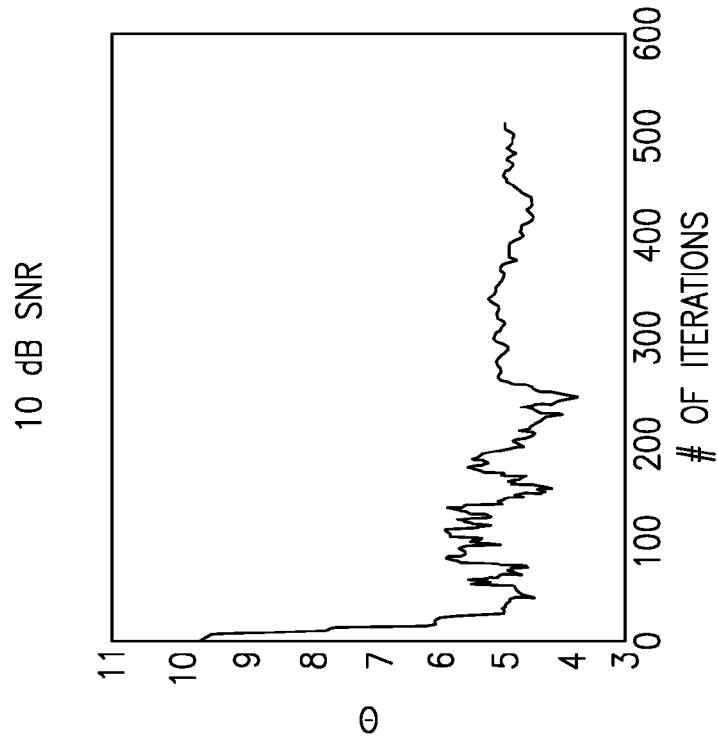
FIGS. 3B and 3C are two examples of plots illustrating convergence of tilt angle as a function of the number of iterations for different signal-to-noise ratio (SNR) levels.
Figure 3B:
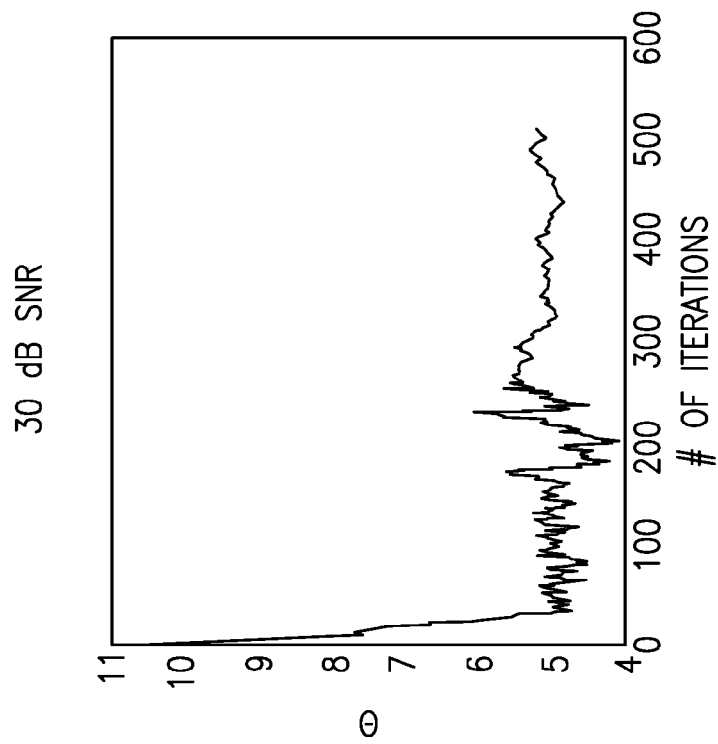

FIGS. 3B and 3C are two examples of plots illustrating convergence of tilt angle as a function of the number of iterations for different signal-to-noise, ratio (SNR) levels. FIG. 3B illustrates convergence for a 30 dB SNR level, and FIG. 3C illustrates convergence for a 10 dB SNR level.

In the illustrated examples, SNR is calculated based on constellations in an AWGN channel. Additionally, after the first 250 iterations, step gain factor K is reduced by factor of 5 to improve stability. Because the data baud rate can be significantly higher than drifting associated with an automatic bias controller, the tracking algorithm can exhibit robustness to variation in SNR. For example, when the SNR level increases, the number of data points in used in the cross-correlation function can be increased to average out the noise.

Example Transceiver Chip

Figure 4A:
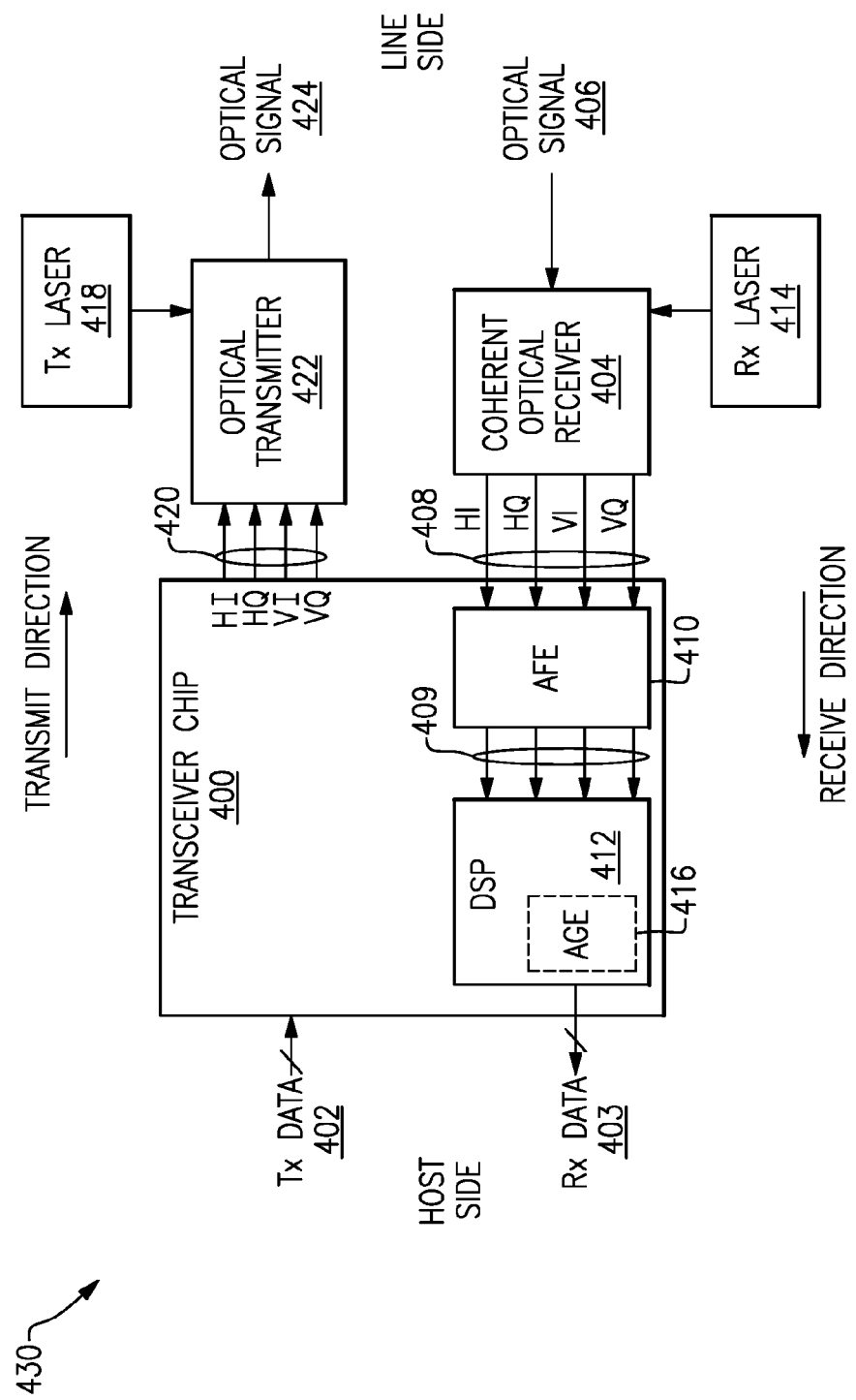
FIG. 4A is a schematic diagram of an optical transceiver system including a transceiver chip according to one embodiment.

FIG. 4A is a schematic diagram of an optical transceiver system 430 according to one embodiment. The optical transceiver system 430 includes a transceiver chip or integrated circuit (IC) 400, a coherent optical receiver 404, an optical transmitter 422, a receive laser 414, and a transmit laser 418.

Although FIG. 4A illustrates one embodiment of an optical transceiver system, an optical transceiver system can be implemented in a wide variety of ways. For example, the optical transceiver system 430 of FIG. 4A can include more or fewer components and/or a different arrangement of components. Additionally, although illustrated in the context of an optical transceiver system, a constellation transformation algorithm can be employed in an optical communication system that omits a transmit path.

As shown in FIG. 4A, the coherent optical receiver 404 generates an analog receive signal vector 408 based on a received optical signal 406 from an optical cable on a line side. The transceiver chip 400 processes the analog receive signal vector 408 to generate receive data 403 for a host device on a host side. As shown in FIG. 4A, the coherent optical receiver 404 receives a local oscillator signal from the receive laser 414, which can be, for example, a continuous wave (CW) laser or integrated tunable laser assembly. The transceiver chip 400 also processes transmit data 402 received form the host side to generate an analog transmit signal vector 420 for the optical transmitter 422. The optical transmitter 422 modulates the analog transmit signal vector 420 using an optical carrier signal from the transmit laser 418 to generate an optical transmit signal 424. Additional details can be similar to those described earlier.

The illustrated transceiver chip 400 includes an analog front-end 410 and a digital processing circuit 412 that includes an adaptive gain equalizer (AGE) 416. The transceiver chip 400 is implemented to provide a constellation transformation algorithm to compensate for distortion in a constellation map recovered from the received optical signal 406.

In the illustrated embodiment, the analog front-end 410 receives the analog receive signal vector 408, which includes HI, HQ, VI, VQ signals in this example. Additionally, the analog front-end 410 processes the analog receive signal vector 408 to generate a digital receive signal vector 409 that is provided to the digital processing circuit 412.

The digital signal processing circuit 412 can provide a wide variety of processing to the digital receive signal vector 409, including, for example, skew correction, filtering, clock recovery, decoding, I and Q amplitude imbalance correction, I and Q phase imbalance correction, compensation for phase noise of the optical carrier, chromatic dispersion compensation, and/or intersymbol interference (ISI) correction. The digital signal processing circuit 412 also generates data representing an original constellation map associated with I and Q signal components recovered from the received optical signal 406.

The digital signal processing circuit 412 also includes the AGE 416, which implements a constellation transformation algorithm. The AGE 416 can implement the constellation transformation algorithm on the data representing the original constellation map, prior to decision slicing and demapping. As described earlier, the AGE 416 can perform a cross-correlation of I and Q components of the data representing the original constellation map, and determine an initial estimate of the tilt angle of the original constellation map. When distortion of the original constellation map is present, the AGE 416 can revise the estimate of the tilt angle θ of the original constellation map by an iterative process, as was described earlier. The AGE 416 can terminate the iterative process once the cross-correlation between the I and Q components is below a threshold value. The AGE 416 can further output a transformed constellation map that is compensated for tilt resulting from a drift in horizontal and/or vertical phase bias voltage. In certain implementations, the AGE 416 applies a transformation matrix given in equation (1) above to the original constellation map.

Additional details of the optical transceiver system 430 of FIG. 4A can be similar to those described earlier.

Figure 4B:
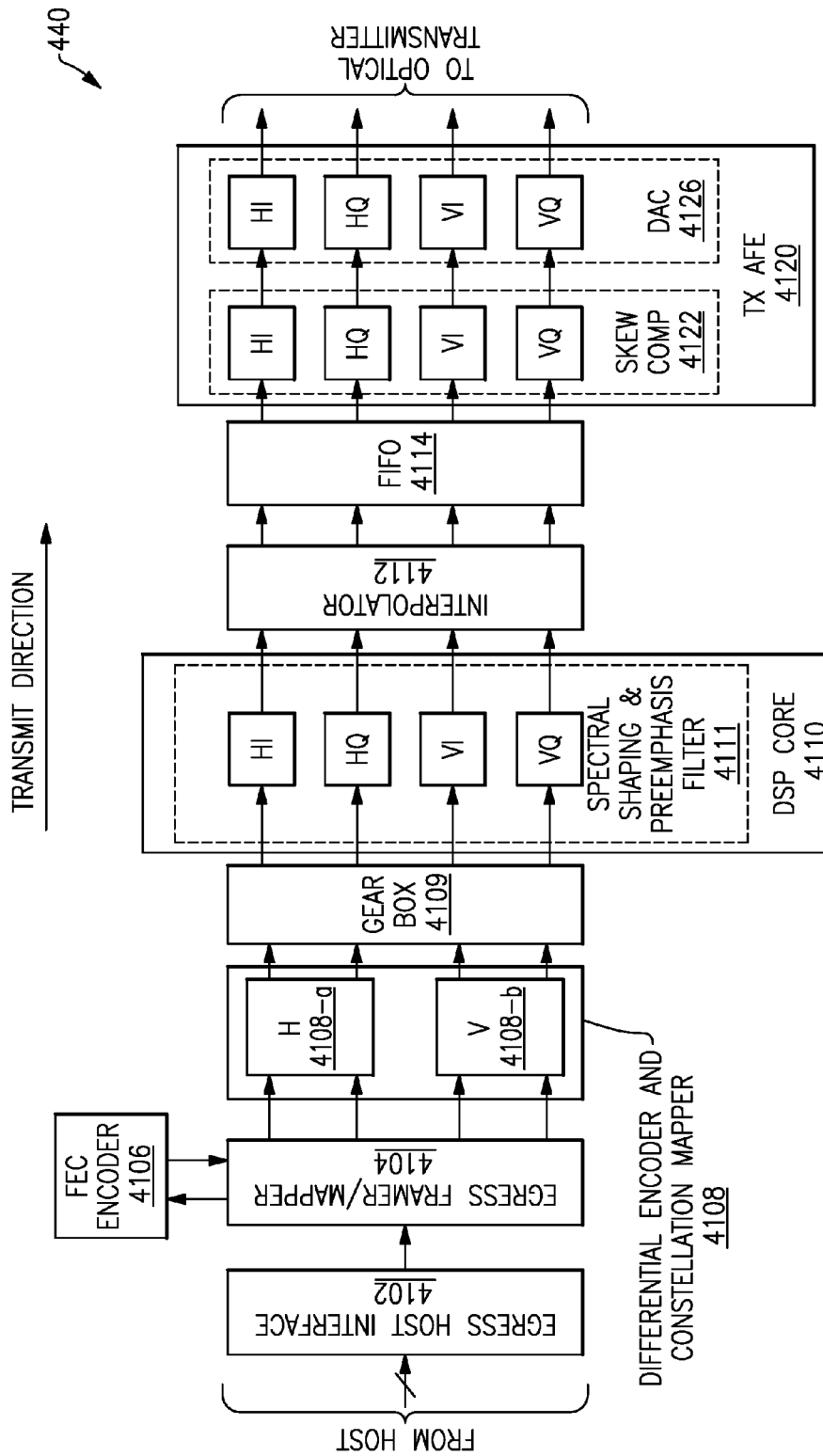
FIG. 4B is a schematic diagram of one embodiment of a transmit path architecture for the transceiver chip of FIG. 4A.

FIG. 4B is a schematic diagram of one embodiment of a transmit path architecture 440 for the transceiver chip 400 of FIG. 4A. The transmit path architecture 440 receives data from a host device and processes the data to generate an analog transmit signal vector for an optical transmitter.

The illustrated transmit path architecture 440 includes an egress host interface 4102, an egress framer/mapper 4104, a forward error correction (FEC) encoder 4106, a differential encoder and constellation mapper 4108, a gear box 4109, a digital signal processing core 4110, an interpolator 4112, a FIFO 4114, and a transmit analog front-end (AFE) 4120. As shown in FIG. 4B, the differential encoder and constellation mapper 4108 includes a horizontal encoder and constellation mapper 4108-a and a vertical encoder and constellation mapper 4108-b. Additionally, the digital signal processing core 4110 includes a spectral shaping and preemphasis filter 4111, and the transmit AFE 4120 includes a skew compensation block 4122 and a digital-to-analog converter (DAC) block 4126.

The egress host interface 4102 processes received data signals from a host device. In certain implementations, the egress host interface 4102 also includes a host demultiplexer configured to recover clock signals from, and demultiplex, the received data signals. The egress host interface 4102 may also perform various processing functions such as, for example, equalization, signal integrity monitoring, and/or skew compensation. The egress framer/mapper 4104 is configured to receive data from the egress host interface 4102 and perform framing/mapping of the data according to a programmable framing/mapping protocol. The FEC encoder 4106 can add error correction bytes according to a forward error correction scheme suitable for a particular optical network. In this example, the differential encoder and constellation mapper 4108 receives four input signal data streams (for example, HI, HQ, VI, and VQ) and generates output signals using dual-polarization (DP) differential or non-differential modulation formats, including, for example, PSK, BPSK, QPSK, 16QAM, and/or QAM of other indices or levels. In certain implementations, processing is performed on a per-polarization basis (for example, separately for each of the horizontal and vertical polarizations using encoders/mappers 4108-a and 4108-h, respectively), or using an encoding/mapping procedure that mixes polarizations.

The gear box 4109 can receive the signal stream from the differential encoder and constellation mapper 4108 at a net data rate corresponding to a nominal data rate and reformat the data in the signal stream to a new data rate to accommodate any modifications to FEC code words. Additionally, the gear box 4109 generates an output signal stream including data at the nominal data rate (for example, at the same data rate as that of the input stream to the gear box 4109). Accordingly, the gear box 4109 is operable to change the parallelization factor of the egress path. In the illustrated embodiment, the digital signal processing core 4110 includes a spectral shaping and preemphasis filter for each lane HI, HQ, VI and VQ. The spectral shaping and preemphasis filter 4111 can be designed to have a frequency response that pre-compensates for, or pre-equalizes, frequency-dependent attenuation of the electrical path between the DAC and the optical transmitter. The interpolator 4112 interpolates the data signal from the digital signal processing core 4110 to convert between sampling rates to enable different components of the egress path architecture to operate at different sampling rates.

The FIFO 4114 includes a data storage buffer that stores and queues blocks of data received in parallel from the interpolator 4112. The FIFO 4114 feeds the data to the transmit AFE 4120. The transmit AFE 4120 includes the skew compensation filter 4122, which compensates the data for skew introduced by the optical transmitter and the electrical signal path associated with the signal lanes of the DAC block 4126. The DAC block 4126 receives the skew-compensated data, and generates analog signals (HI, HQ, VI, VQ) for transmission to the optical transmitter.

The transmit path architecture 440 of FIG. 4B illustrates one example of transmit path circuitry suitable for a transceiver chip. However, a transceiver chip can include transmit path architectures implemented in a wide variety of ways.

Figure 4C:
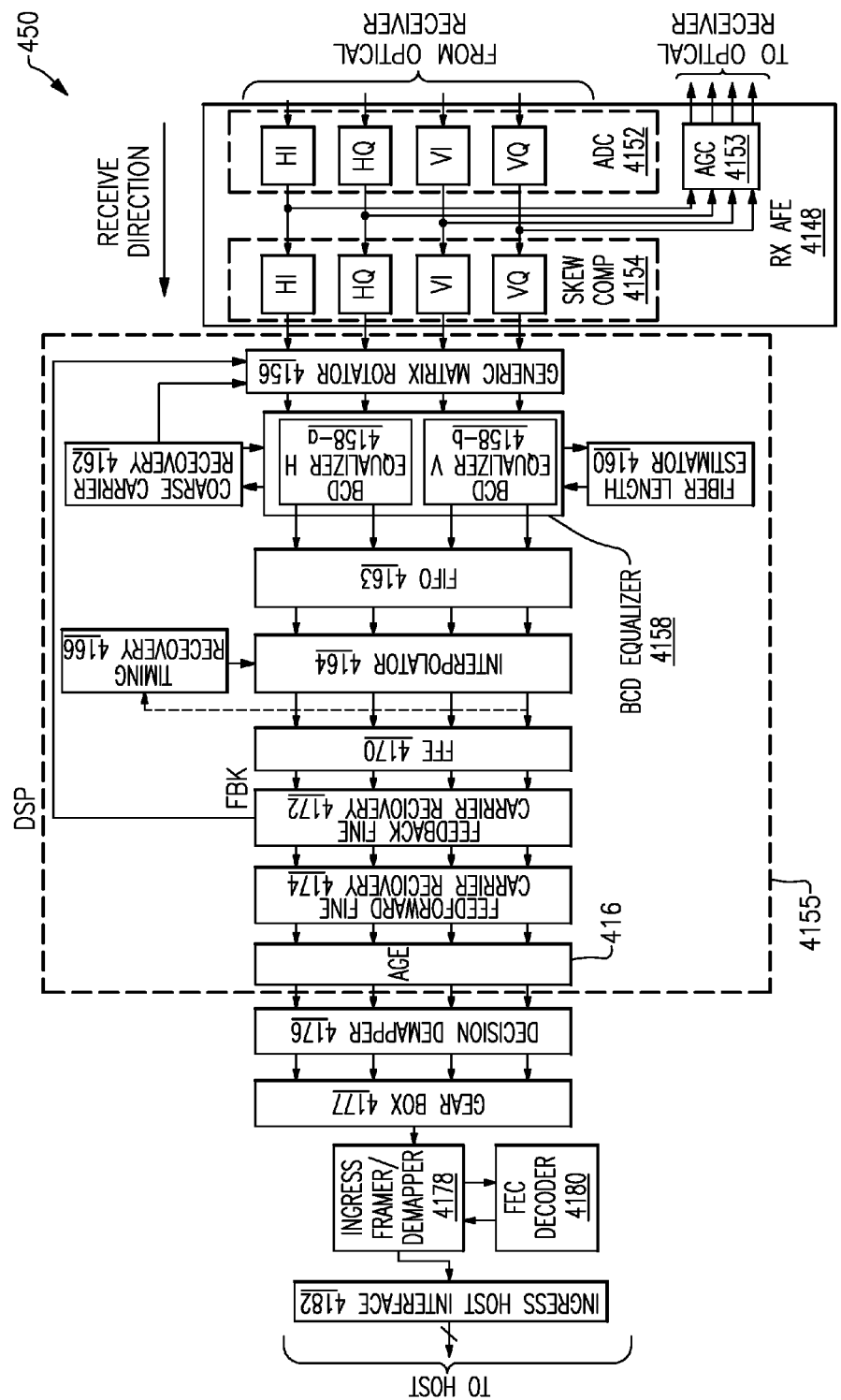
FIG. 4C is a schematic diagram of one embodiment of a receive path architecture for the transceiver chip of FIG. 4A.

FIG. 4C is a schematic diagram of one embodiment of a receive path architecture 450 for the transceiver chip of FIG. 4A. The receive path architecture 450 receives an analog receive signal vector from an optical receiver and processes the data to generate transmit data for a host device.

The illustrated receive path architecture 450 includes a receive analog front-end (AFE) 4148, a digital signal processing circuit 4155, a decision demapper or slicer 4176, a gear box 4177, an ingress framer/demapper 4178, a FEC decoder 4180, and an ingress host interface 4182.

The illustrated receive AFE 4148 includes an analog-to-digital converter (ADC) block 4152 that converts the analog receive signal vector to a digital signal vector, which is processed by skew compensation filters 4154 to compensate for differences in signal delays. The ADC block 4152 can be programmable to operate with different resolutions and/or different programmable data rates (for example, 32 GSa/s for DP-16QAM, 64 GSa/s for DP-QPSK, at 128 Gb/s line rate). In certain implementations, the receive AFE 4148 can include a line demultiplexer configured to parallelize the data for processing by the digital signal processing circuit 4155. In the illustrated embodiment, the receive AFE 4148 also includes an automatic gain control circuit 4153 that detects the amplitude of the received analog signals and provides feedback to the optical receiver to control gain.

The illustrated digital signal processing circuit 4155 includes a generic matrix rotator 4156, a bulk chromatic dispersion (BCD) equalizer 4158, a fiber length estimator 4160, a coarse carrier recovery block 4162, a FIR) 4163, an interpolator 4164, a timing recovery block 4166, a feedforward equalizer (HE) 4170, a feedback fine carrier recovery block 4172, a feedforward fine carrier recovery block 4174, and an AGE 416.

The generic matrix rotator 4156 applies a matrix transformation to the digital signal vector to compensate for impairments associated with optical demodulation in the optical receiver. Additionally, the BCD equalizer 4158 includes a horizontal compensator/equalizer 4158-*a* and a vertical compensator/equalizer 4158-*b*, which operate to compensate for chromatic dispersion in the optical channel. Furthermore, the fiber length estimator 4160 can estimate the extent or amount of chromatic dispersion introduced by the optical channel to select a mode of operation of the BCD equalizer 4158, and the coarse carrier recovery block 4162 performs an initial frequency acquisition or carrier recovery of the received signal during a start-up phase.

The FIFO 4163 operates as a data storage buffer that stores and queues blocks of data samples received from the BCD equalizer 4158. The interpolator 4164 processes data from the FIFO 4163 to correct for I/Q imbalances, such as skew between I and Q components and/or a difference in amplitude between I and Q components. The interpolator 4164 can perform sampling rate conversion to interface between the digital signal processing circuit 4155 and the receive AFE 4148 without loss of data samples. The timing recovery block 4166 estimates the frequency and phase of the received data signal and generates timing information used to recover the data. The FFE 4170 filters the data and applies equalization to compensate for intersymbol interference (ISI) effects imposed by the optical and electrical channels. The feedback fine carrier recovery block 4172 and the feedforward fine carrier recovery block 4174 further refine the carrier recovery performed by the coarse carrier recovery block 4162. As shown in FIG. 4C, the feedback fine carrier recovery block 4172 provides a feedback signal FBK to the generic matrix rotator 4156.

The AGE 416 processes I and Q data from the feedforward fine recover block 4174. The AGE 416 provides a constellation transformation algorithm, which can be as described earlier. In the illustrated embodiment, the AGE 416 provides constellation transformation to digital I and Q data after feed-forward equalization (FFE) and carrier recovery.

In one embodiment, the AGE 416 provides a constellation transformation separately to I/Q data associated with horizontal and vertical polarizations. Implementing the AGE 416 in this manner enhances the accuracy of constellation transformation by allowing different amounts of tilt adjustment to be provided for a horizontal constellation map and for a vertical constellation map.

The decision demapper or slicer 4176 operates to decode transformed constellation data from the AGE 416. The decision demapper or slicer 4176 can provide a variety of information, such as the most probable decoded bits based on the transformed constellation data. The gear box 4177 can change a parallelization factor of the data from the decision demapper 4176. The ingress flamer/demapper 4178 performs framing and demapping of data so as to transform modulation symbols to source bits. The FEC decoder 4180 can be used to add error correction using a forward error correct scheme. The ingress host interface 4182 is used to provide data to a host device using a desired protocol. In certain implementations, the ingress host interface 4182 includes a host multiplexer for multiplexing data provided to the host device.

The receive path architecture 450 of FIG. 4C illustrates one example of receive circuitry suitable for a transceiver chip. However, a transceiver chip can include receive path architectures implemented in a wide variety of ways.

Example Method of Transforming Constellation Map to Compensate for Tilt

Figure 5:
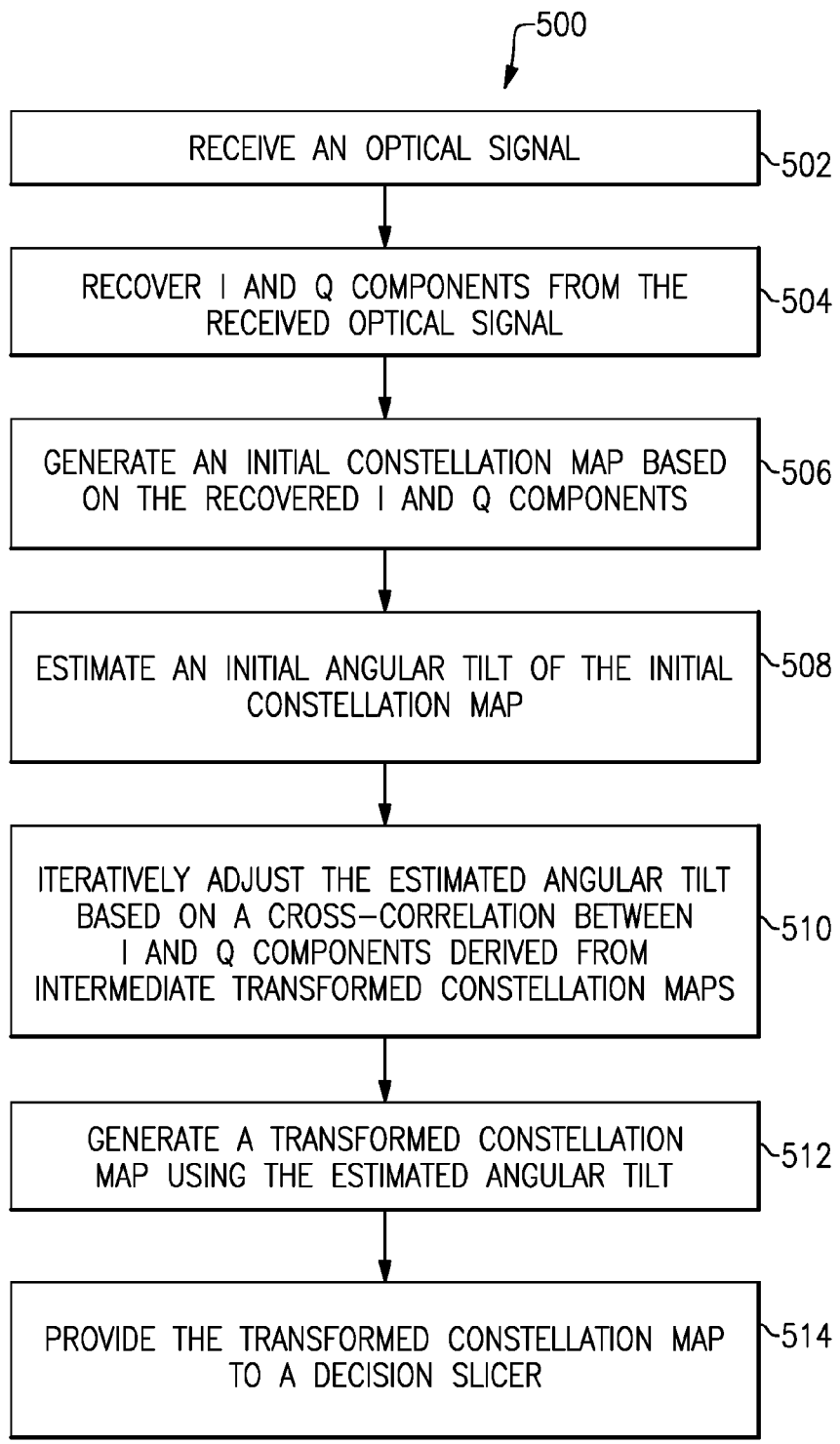
FIG. 5 is a flowchart of a method of constellation transformation according to one embodiment.

FIG. 5 is a flowchart of a method 500 of constellation transformation according to one embodiment.

The method 500 includes receiving an optical signal as depicted in block 502. The optical signal can be similar to the received optical signal 132 discussed above with reference to FIG. 1 and/or the received optical signal 406 discussed above with reference to FIG. 4A. The optical signal can be received by a coherent receiver (for example, coherent receiver 120 and/or coherent receiver 404).

As shown in block 504, I and Q components are recovered from the received optical signal. The I and Q components can recovered and processed as discussed above to compensate for various channel and optical demodulator impairments. For example, the recovered I and Q components can be obtained by converting the electrical signals received from the coherent optical receiver into digital format and processing the digital signal using a digital signal processing circuit (for example, the digital signal processing circuit 412), which can include the one or more of various functional blocks described earlier. In certain implementations, the I and Q components are processed for at least one of feed-forward equalization (FFE)) or carrier recovery.

An initial constellation map $C_{initial}$ can be generated based on the recovered I and Q components as shown in block 506. Additionally, as shown in block 508, an initial angular tilt $\theta_{initial}$ of the initial constellation map $C_{initial}$ is estimated. In certain implementations, the tilt angle is measured with respect to an orthogonal constellation map.

As shown in block 510, the tilt angle is iteratively adjusted based on a cross-correlation between I and Q components derived from intermediate transformed constellation maps obtained during the iterative process. For example, the iterative process can be used to obtain a new transformation matrix $M_n$ obtained by substituting the value of $\theta_n$ obtained at each $n^{th}$ iteration of the iterative process in equation (1) above. Additionally, the new transformation matrix $M_n$ can be applied to the constellation map $C_{n-1}$ obtained in the $(n-1)^{th}$ iteration of the iterative process to obtain a new constellation map $C_n$. Furthermore, modified I and Q components $wi_n$ and $wq_n$ can be derived from the new constellation map $C_n$, and the cross-correlation between the derived I and Q components $wi_n$ and $wq_n$ can be processed to revise the estimate of the angular tilt.

The iterative process can be terminated when the cross-correlation between I and Q components derived from transformed constellation map obtained during the $n^{th}$ iteration of the iterative process $R(wi_n, wq_n)$ is about zero (0). For example, the iterative process can be terminated if $R(wi_n, wq_n)$ is less than or equal to a convergence threshold value (for example, less than or equal to 0.5, less than or equal to 0.1, less than or equal to 0.01, less than or equal to 0.001, less than or equal to 0.0001 or values in between these ranges and sub-ranges). The tilt angle $\theta_{converged}$ obtained at the end of the iterative of the iterative process can be considered to be the converged estimate of the tilt of the initial constellation map $C_{initial}$ relative to the selected angular reference point.

At the end of the iterative process, a transformed constellation map is obtained as shown in block 514. The transformed constellation map can be equivalent to the constellation map obtained by applying a transformation matrix M calculated by substituting the tilt angle $\theta_{converged}$ to the initial constellation map $C_{initial}$. The transformed constellation map is provided to the decision slicer, as shown in block 514, to decode the recovered I and the Q components for further processing. The method 500 can be implemented using an electronic hardware processor such as for example the transceiver 110, the transceiver chip 400, the digital signal processing circuit 412, the optical receivers 608a and/or 608b described herein.

In one embodiment, the method 500 of FIG. 5 is performed with respect to I/Q components obtained from an optical signal including a single polarization. In another embodiment, the method 500 is performed with respect to two sets of I/Q components obtained from an optical signal including dual-polarization. For example, a first constellation transformation can be performed on a first set of I/Q data associated with a horizontal polarization, and a second constellation transformation can be performed on a second set of I/Q data associated with a vertical polarization. Thus, different amounts of tilt adjustment can be provided for a horizontal constellation map and for a vertical constellation map. In such an embodiment, $\theta_H$ for adjusting a horizontal constellation map is obtained by iteratively processing the first set of I/Q data associated with horizontal polarization, and $\theta_V$ for adjusting a vertical constellation map is obtained by iteratively processing I/Q data associated with a vertical polarization.

Additional details of the method 500 can be as described earlier.

Example Optical Communication Systems

Figure 6:
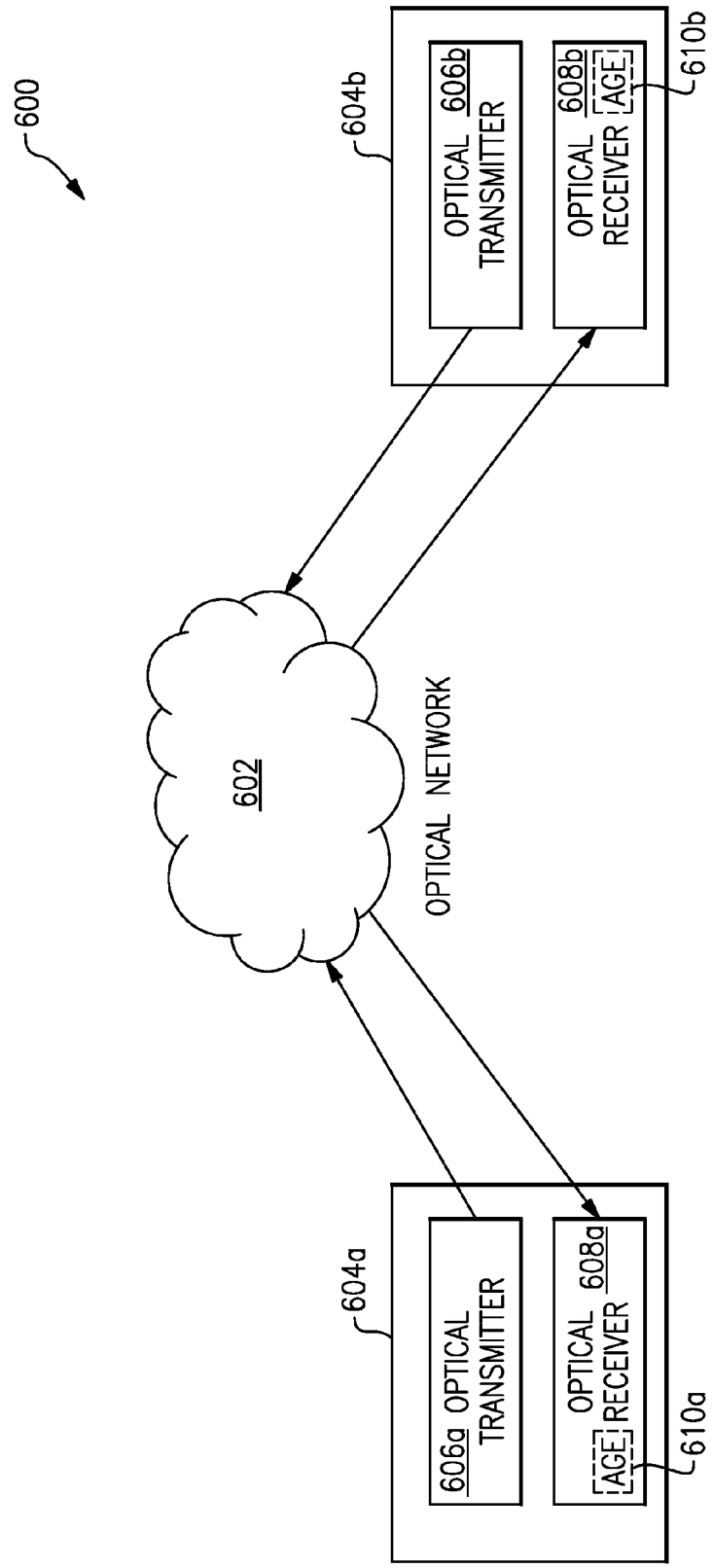
FIG. 6 is a schematic diagram of a first optical communication system in communication with another optical communication system via an optical network.

FIG. 6 is a schematic diagram 600 of an optical communication system 604a in communication with another optical communication system 604b via an optical network 602.

The optical communication system 604a includes an optical transmitter 606a, an optical receiver 608a, and an AGE 610a configured to implement a constellation transformation algorithm to compensate for the tilt in a constellation map of a received signal as a result of bias drills. The optical communication system 604b includes an optical transmitter 606b, an optical receiver 608b, and an AGE 610b configured to implement a constellation transformation algorithm to compensate for the tilt in a constellation map of a received signal as a result of bias drifts.

The optical communication systems 604a and 604b can operate in a router, a server, a hub, a datacenter system, a network backhaul system, a computer, a phone system, or any other system that transmits and receives optical signals over the optical network 602. The optical network 602 can be a DWDM network, an OFDM network, a TDM network, etc. In various implementations, the optical communication systems 606a and 606b can include one or more components and functional blocks similar to one or more of the components and functional blocks of the transceiver architecture described above with reference to FIGS. 4A-4C.

Example Experimental Results

Figure 7:
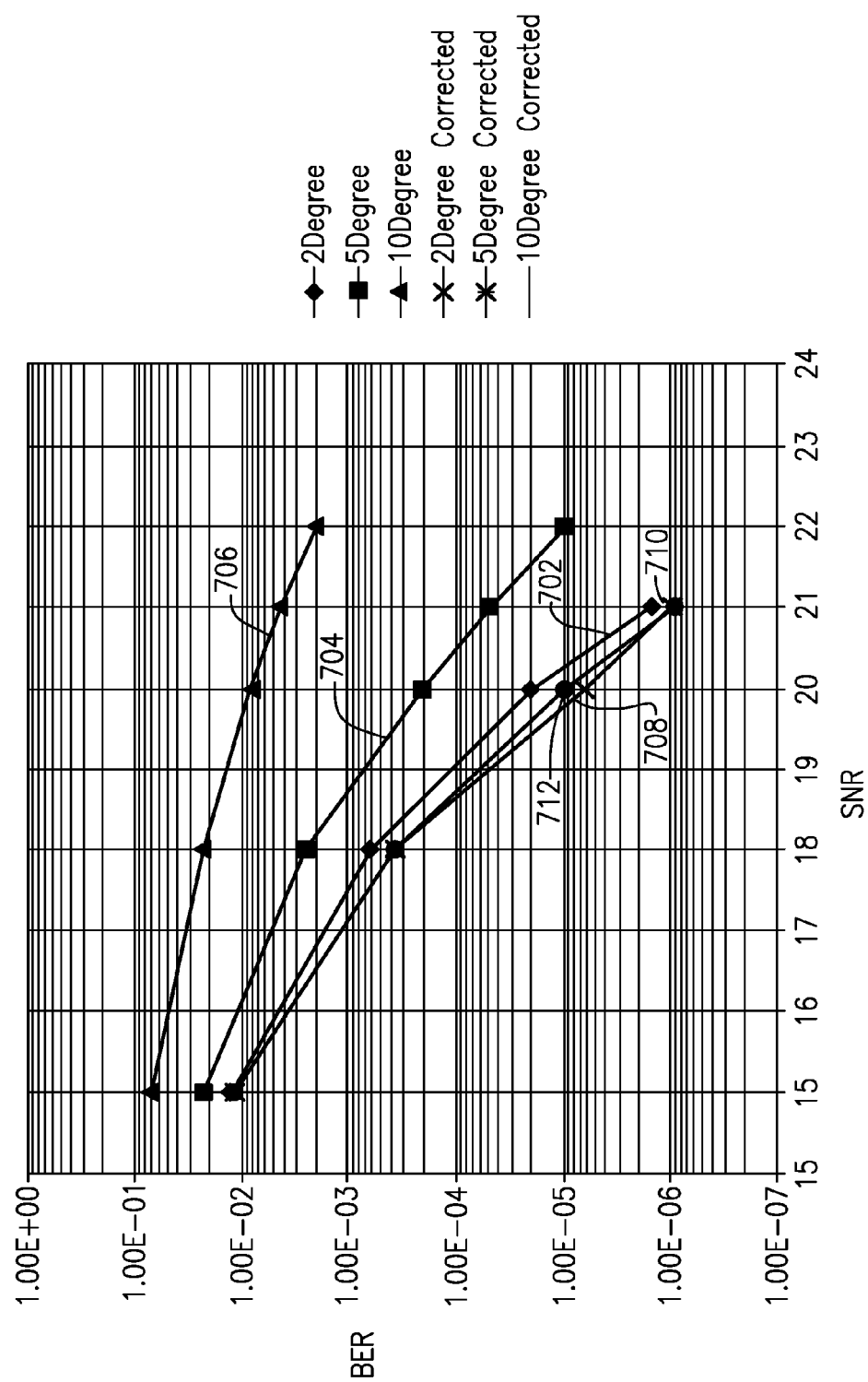
FIG. 7 is a plot of simulated bit-error-rate (BER) curves versus optical signal to noise ratio (OSNR).

FIG. 7 is a plot of simulated bit-error-rate (BER) curves versus optical signal to noise ratio (OSNR) for optical signals generated by modulators in which one of the horizontal phase bias voltage or the vertical phase bias voltage had a drift of 2, 5 and 10 degrees. The BER curves are obtained by simulating constellations associated with a 16-level Quadrature amplitude modulated (QAM) signal.

Curves 702, 704 and 706 represent the simulated BER curves when the horizontal or the vertical phase bias voltage drift is 2, 5 and 10-degrees respectively. It is noted that the power penalty at a BER of $10^{-3}$ is about 2 dB for a 5-degree offset in bias. A 5-degree offset for a $LiNbO_3$ modulator translates to about 200 mV of fluctuation in the bias voltage when biased around a null point of about 4V. Thus, small fluctuations in the bias voltage can result in significant decrease in link power budget. Curves 708, 710 and 712 represent the simulated BER curves the constellation map is transformed by one implementation of a constellation transformation algorithm to compensate for horizontal or the vertical phase bias voltage offset of 2, 5 and 10-degrees respectively. It is noted that the OSNR specification to obtain a BER of $10^{-3}$ does not change when the constellation map is transformed to compensate for the bias offsets.

To further test the robustness and effectiveness of the constellation transformation algorithm, experiments were conducted with an integrated System-on-Chip (SoC) solution, which included analog front-ends (ADC and DAC), appropriate digital signal processing blocks, and signal generators and bit-error-rate testers. The setup and/or architecture of the SoC solution can be similar to the system and architecture depicted in FIG. 4A. For testing purposes a 253.27-Gb/s dual-polarization (DP) 16-QAM optical signals were generated via Fujitsu DP-QPSK Mach-Zehnder Modulator (MZM). Eight (8) channels with different pseudo random bits sequence (PRBS) were mapped onto the two 16-QAM constellations and sent through four on-chip DACs at 31.66-GBaud each. On the receiver side, four on-chip ADCs were used to sample the signals from an integrated coherent receiver and eight (8) corresponding channel BER tester (BERT) was used to compute BER simultaneously after the digital signal processing blocks. The signals measured by the BERT were not compensated for the offsets in the bias voltage.

An on-chip diagnostic unit was used to capture the demodulated constellation after the digital signal processing block and input into a computer for post processing which included transforming the constellation map to compensate for the bias offset. Although the system was configured as dual-polarization system, an offset was introduced in only the vertical phase bias voltage and BER was monitored. The BER of optical signals with horizontal-polarization were substantially unaffected since digital signal processing block could isolate the two polarizations using constant modulus algorithm (CMA).

Figure 8:
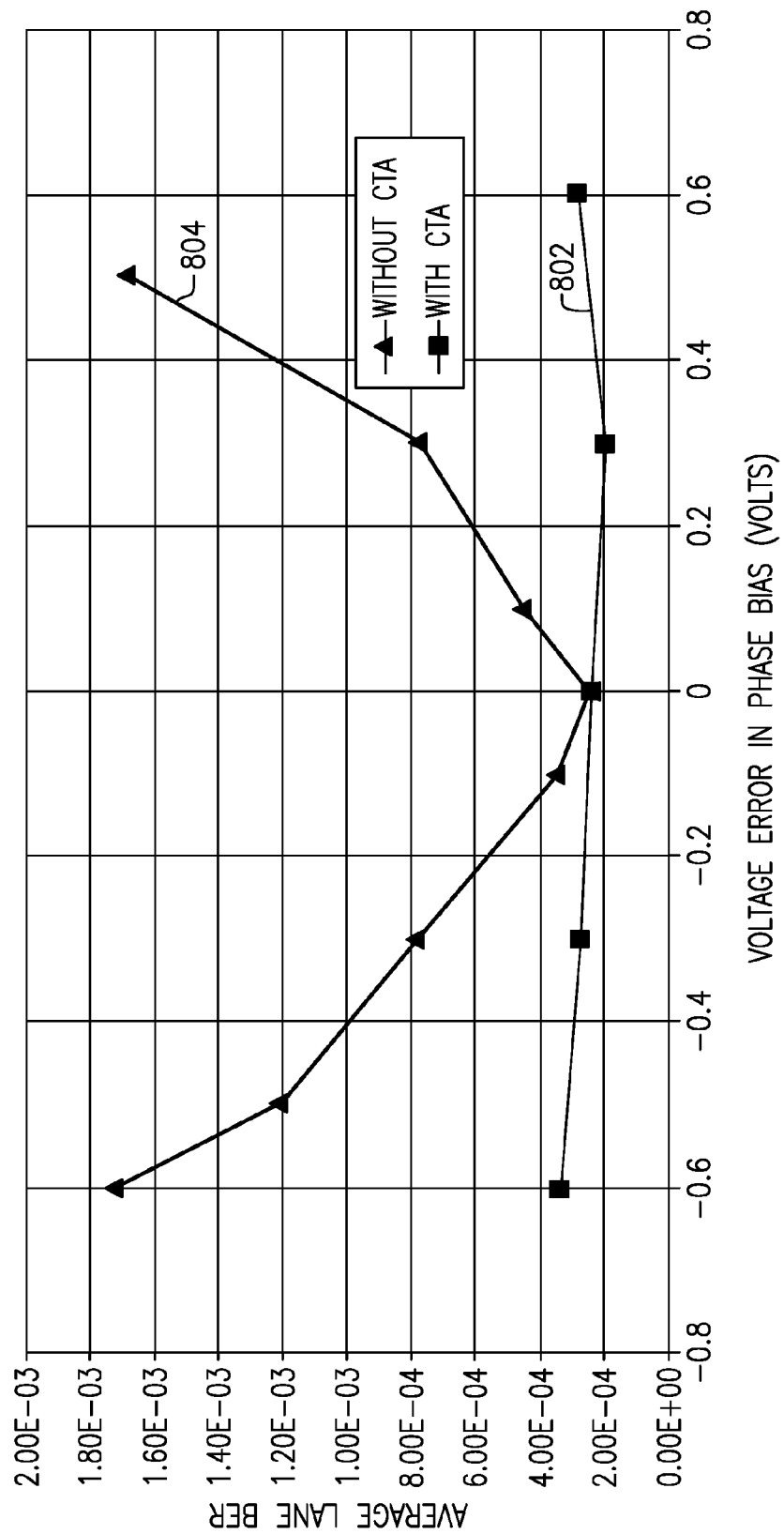
FIG. 8 is a plot of one example of the measured average lane bit error rate (BER) versus offset of a vertical phase bias voltage.

FIG. 8 is a plot of the measured average lane BER versus offset in the vertical phase bias voltage. The average lane BER can be obtained by averaging the BER obtained for I and Q components. Curve 802 of FIG. 8 illustrates the measured average lane BER obtained by post-processing the de-modulated constellation using one implementation of a constellation transformation algorithm (CIA) to compensate for the offset in the vertical phase bias voltage and curve 804 obtained without transforming the constellation map to compensate for the offset in the vertical phase bias voltage. It is noted that the uncompensated BER curve 804 shows an increase in BER as the offset in the vertical phase bias voltage increases indicating degradation of the quality of the recovered signals. It is also noted that the compensated BER curve 802 shows relatively constant BER as the offset in the vertical phase bias voltage increases indicating that the quality of the recovered signals is maintained.

Figure 9A:
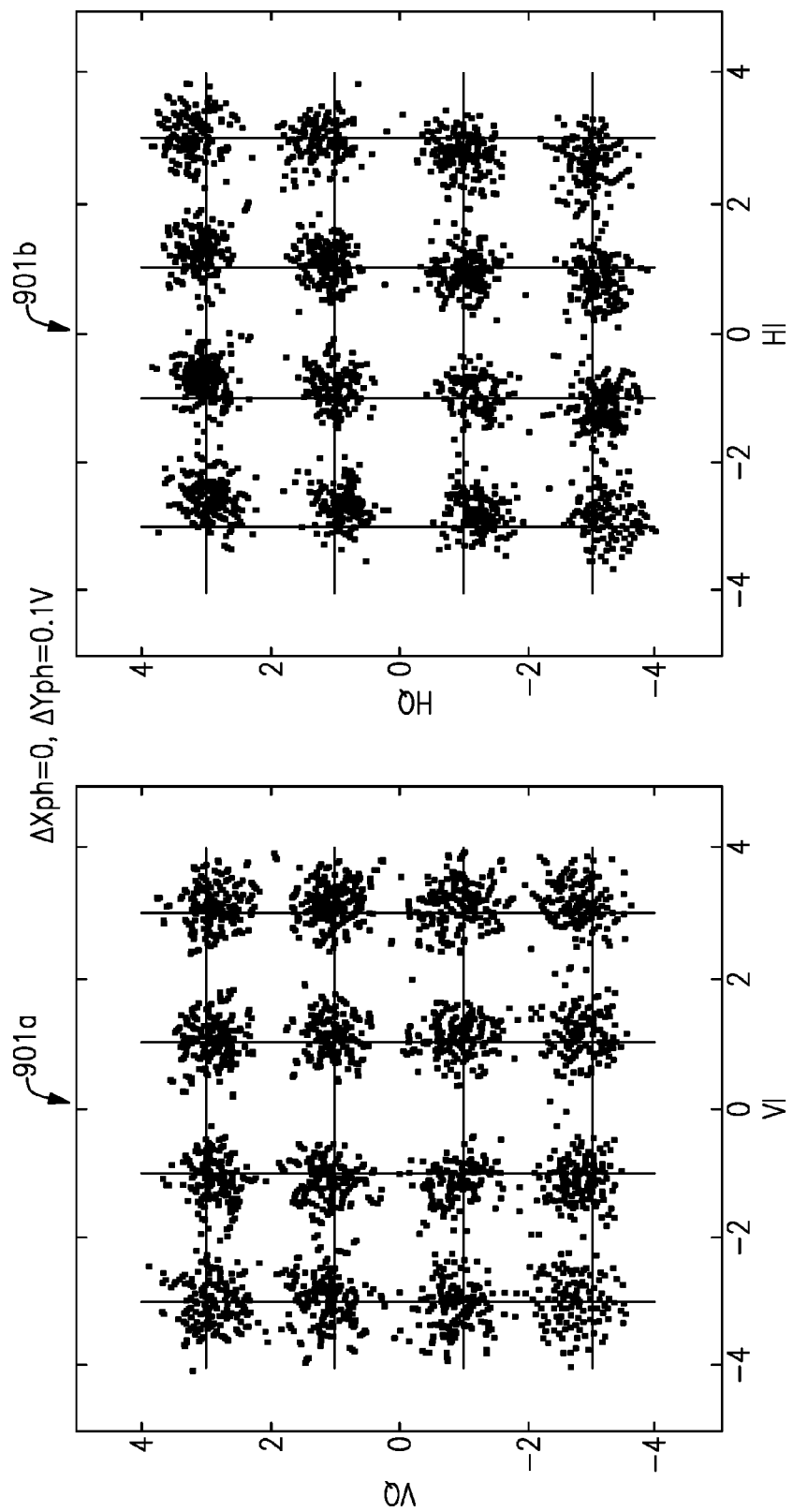
FIGS. 9A-9C show examples of constellation maps for vertical and horizontal polarizations for different phase bias voltage offsets.

FIG. 9A illustrates the constellation maps for the vertical and horizontal polarizations when the offset in the vertical phase bias voltage was 0.1V. In FIG. 9A, constellation map 901*a* depicts the in-phase (I) and quadrature-phase (Q) components recovered from the optical signal with vertical polarization signal and constellation map 901*b* depicts I and Q components recovered from the optical signal with horizontal polarization.

Figure 9B:
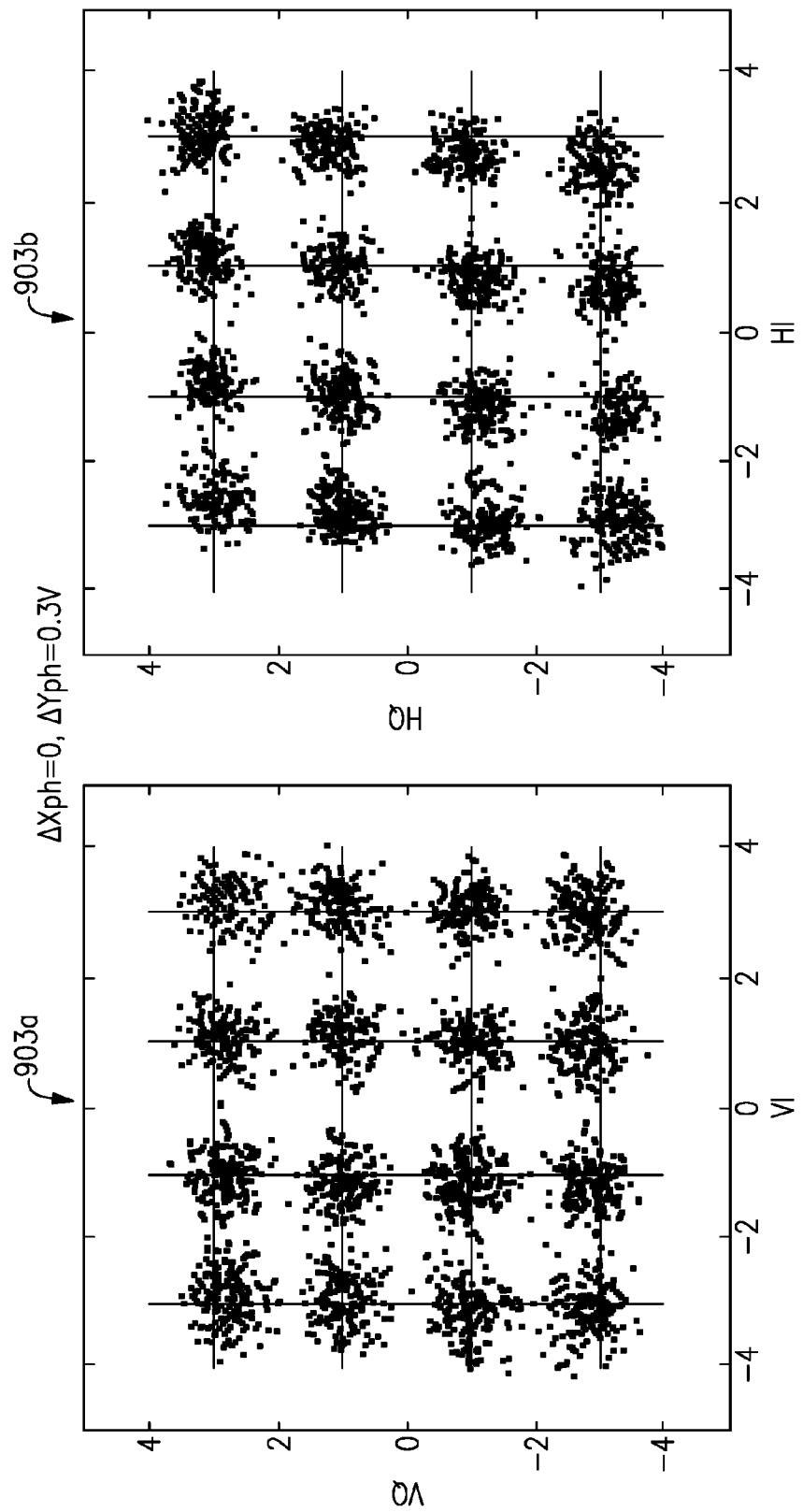

FIG. 9B illustrates the constellation maps for the vertical and horizontal polarizations when the offset in the vertical phase bias voltage is 0.3V. In FIG. 9B, constellation map 903*a* depicts the in-phase (I) and quadrature-phase (Q) components recovered from the optical signal with vertical polarization signal and constellation map 903*b* depicts the in-phase (I) and quadrature-phase (Q) components recovered from the optical signal with horizontal polarization.

Figure 9C:
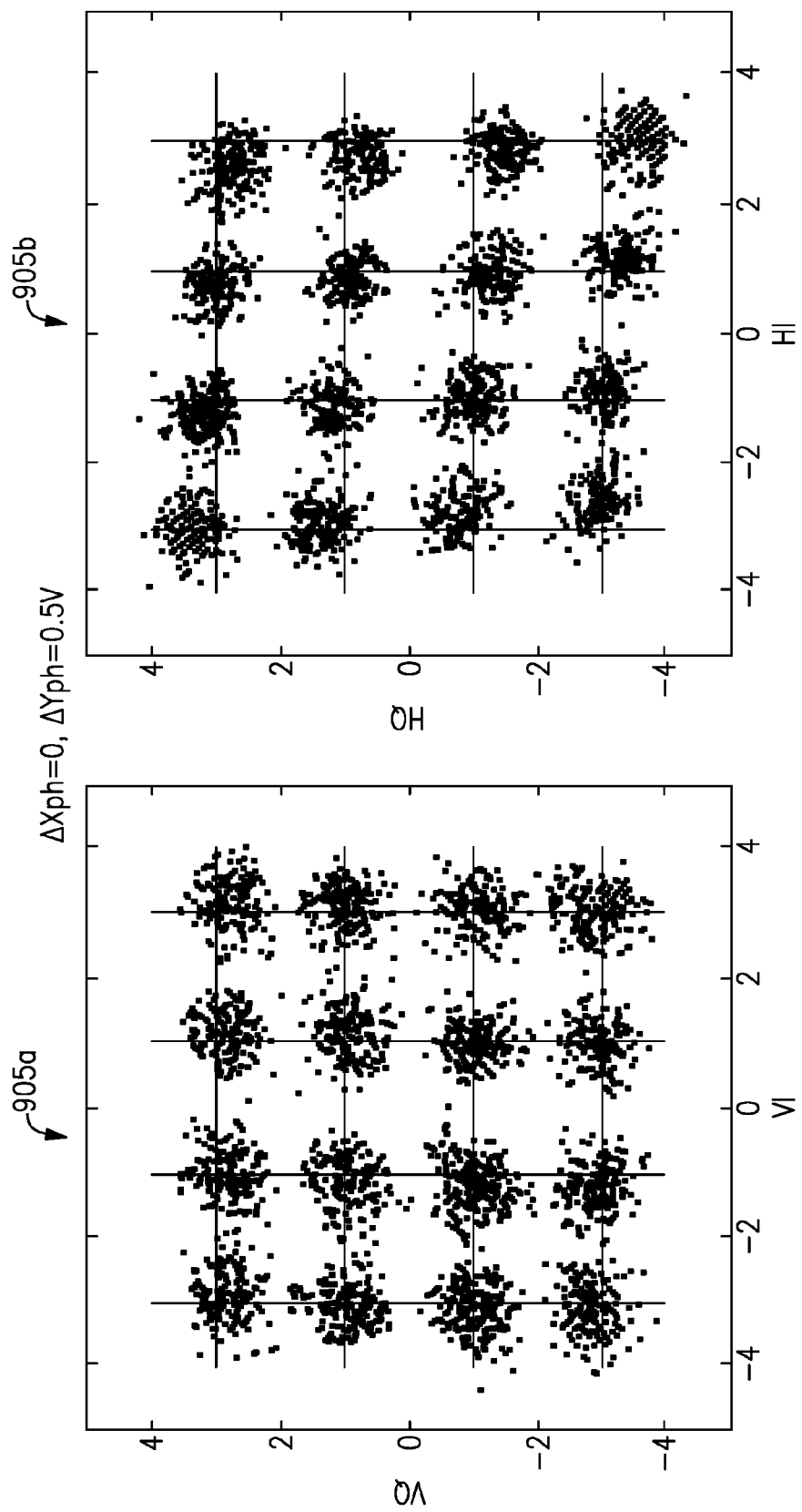

FIG. 9C illustrates the constellation maps for the vertical and horizontal polarizations when the offset in the vertical phase bias voltage was −0.5V. In FIG. 9C, constellation map 905*a* depicts the I and Q components recovered from the optical signal with vertical polarization signal and constellation map 905*b* depicts the I and Q components recovered from the optical signal with horizontal polarization.

The constellation maps illustrated in FIGS. 9A, 9B and 9C depict the constellation map prior to transformation to correct for the offset in the vertical phase bias voltage. The post-processing constellation transformation algorithm discussed herein can be used to compensate for the tilt of the depicted maps with respect to orthogonal axes. Although the constellation maps of FIGS. 9A, 9B and 9C illustrated various examples of constellations that can be compensated, the teachings herein can be used to provide compensation to a wide variety of signal constellations.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure, indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An integrated circuit comprising:
an analog front-end configured to convert an analog signal vector representing an optical signal into a digital signal vector, wherein the digital signal vector comprises a digital representation of an in-phase (I) component and a quadrature-phase (Q) component of the optical signal; and
a digital signal processing circuit configured to generate signal data representing a signal constellation of the digital signal vector,
wherein the digital signal processing circuit comprises an adaptive gain equalizer configured to generate transformed signal data by compensating the signal data for distortion of the signal constellation, wherein the adaptive gain equalizer is configured to generate an estimate of an angular tilt of the signal constellation and to compensate the signal data based on the estimate of the angular tilt.

2. The integrated circuit of claim 1, wherein the adaptive gain equalizer is configured to generate the estimate of the angular tilt based on a sum of a plurality of cross-correlations of I and Q components of the signal constellation.

3. The integrated circuit of claim 2, wherein the sum of the plurality of cross-correlations is computed over a moving window of data samples obtained from the digital signal vector.

4. The integrated circuit of claim 1, wherein the adaptive gain equalizer is configured to iteratively revise the estimate of the angular tilt until I and Q components of the transformed signal data are substantially uncorrelated.

5. The integrated circuit of claim 4, wherein the adaptive gain equalizer is configured to iteratively revise the estimate of the angular tilt based on a step gain, wherein the step gain changes based on a number of times the angular tilt has been estimated.

6. The integrated circuit of claim 1, wherein the adaptive gain equalizer is configured to generate the transformed signal data based on a transformation matrix that includes the estimate of the angular tilt.

7. The integrated circuit of claim 6, wherein the transformation matrix is about equal to $$\frac{1}{\cos^2\theta - \sin^2\theta}\begin{bmatrix} \cos\theta & -\sin\theta \\ -\sin\theta & \cos\theta \end{bmatrix},$$

wherein θ is the estimate of the angular tilt.

8. The integrated circuit of claim 1, wherein the digital signal processing circuit is configured to process the signal data for at least one of feed forward equalization or carrier recovery prior to compensating the signal data for distortion of the signal constellation.

9. The integrated circuit of claim 1, further comprising a decision slicer configured to slice the transformed signal data.

10. The integrated circuit of claim 1, wherein the distortion of the signal constellation comprises at least one of squeezing, shifting, or tilting.

11. The integrated circuit of claim 1, wherein the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

12. The integrated circuit of claim 1, wherein the digital signal vector comprises data representing a single polarization modulation or a dual-polarization modulation.

13. A method of digital signal constellation transformation in an optical communication device, the method comprising:
receiving an optical signal as an input to a coherent optical receiver;
generating an analog signal vector representing the optical signal using the coherent optical receiver;
converting the analog signal vector into a digital signal vector using an analog front-end, wherein the digital signal vector comprises a digital representation of an in-phase (I) component and a quadrature-phase (Q) component of the optical signal;
generating signal data representing a signal constellation of the digital signal vector using a digital signal processing circuit; and
compensating the signal data for distortion of the signal constellation using an adaptive gain equalizer of the digital signal processing circuit, wherein compensating the signal data for distortion comprises generating an estimate of an angular tilt of the signal constellation and compensating the signal data based on the estimate of the angular tilt.

14. The method of claim 13, further comprising transforming the signal data based on a transformation matrix that includes the estimate of the angular tilt.

15. The method of claim 13, wherein generating the estimate of the angular tilt comprises summing a plurality of cross-correlations of I and Q components of the signal constellation.

16. The method of claim 15, further comprising iteratively revising the estimate of the angular tilt.

17. The method of claim 13, further comprising processing the signal data for at least one of feed forward equalization or carrier recovery prior to compensating the signal data for distortion of the signal constellation.

18. The method of claim 13, wherein the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

19. The method of claim 13, wherein the digital signal vector comprises data representing a single polarization modulation or a dual-polarization modulation.

20. An integrated optical module comprising:
a coherent optical receiver configured to receive an optical signal from an optical cable and to generate an analog signal vector representing the optical signal; and
a transceiver configured to process the analog signal vector to generate a digital signal vector comprising a digital representation of an in-phase (I) component and a quadrature-phase (Q) component of the optical signal, wherein the transceiver is further configured to generate signal data representing a signal constellation of the digital signal vector,
wherein the transceiver comprises an adaptive gain equalizer configured to generate transformed signal data by compensating the signal data for distortion of the signal constellation, wherein the adaptive gain equalizer is configured to generate an estimate of an angular tilt of the signal constellation and to compensate the signal data based on the estimate of the angular tilt.

21. The integrated optical module of claim 20, wherein the adaptive gain equalizer is configured to generate the estimate of the angular tilt based on a sum of a plurality of cross-correlations of I and Q components of the signal constellation.

22. The integrated optical module of claim 20, wherein the adaptive gain equalizer is configured to iteratively revise the estimate of the angular tilt until I and Q components of the transformed signal data are substantially uncorrelated.

23. An integrated optical module comprising:
a coherent optical receiver configured to receive an optical signal from an optical cable and to generate an analog signal vector representing the optical signal; and
a transceiver configured to process the analog signal vector to generate a digital signal vector comprising a digital representation of an in-phase (I) component and a quadrature-phase (Q) component of the optical signal, wherein the transceiver is further configured to generate signal data representing a signal constellation of the digital signal vector,
wherein the transceiver comprises an adaptive gain equalizer configured to generate transformed signal data by compensating the signal data for distortion of the signal constellation, wherein the adaptive gain equalizer provides separate distortion compensation for a first portion of the signal data associated with a horizontal polarization of the optical signal and for a second portion of the signal data associated with a vertical polarization of the optical signal.

24. The integrated optical module of claim 23, wherein the adaptive gain equalizer is configured to generate an estimate of an angular tilt of the signal constellation and to compensate the signal data based on the estimate of the angular tilt.

25. The integrated optical module of claim 20, wherein the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

26. The integrated optical module of claim 20, wherein the digital signal vector comprises data representing a single polarization modulation or a dual-polarization modulation.

27. An optical communication system comprising:
an optical transmitter configured to provide optical transmissions over an optical network;
an optical receiver configured to receive an optical signal over the from the optical network and to generate an analog signal vector representing the optical signal; and
a transceiver coupled to the optical transmitter and to the optical receiver, the transceiver comprising:
an analog front-end configured to convert the analog signal vector into a digital signal vector, wherein the digital signal vector comprises a digital representation of an in-phase (I) component and a quadrature-phase (Q) component of the optical signal; and
a digital signal processing circuit configured to generate signal data representing a signal constellation of the digital signal vector,
wherein the digital signal processing circuit comprises an adaptive gain equalizer configured to generate transformed signal data by compensating the signal data for distortion of the signal constellation, wherein the adaptive gain equalizer is configured to generate an estimate of an angular tilt of the signal constellation and to compensate the signal data based on the estimate of the angular tilt.

28. The optical communication system of claim 27, wherein the optical transmitter comprises one or more modulators and an automatic bias controller configured to bias the one or more modulators.

29. The optical communication system of claim 27, wherein the optical signal comprises a multi-level quadrature amplitude modulation (QAM) signal, a discrete multi-toned (DMT) modulation signal, an orthogonal frequency division multiplexing (OFDM), or a phase-shift keying (PSK) signal.

30. The optical communication system of claim 27, wherein the digital signal vector comprises data representing a single polarization modulation or a dual-polarization modulation.

31. The optical communication system of claim 27, wherein the adaptive gain equalizer is configured to iteratively revise the estimate of the angular tilt until I and Q components of the transformed signal data are substantially uncorrelated.

32. The integrated optical module of claim 23, wherein the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

33. The integrated optical module of claim 23, wherein the distortion of the signal constellation comprises at least one of squeezing, shifting, or tilting.

\* \* \* \* \*